US012627146B2

(12) United States Patent
Sakata et al.

(10) Patent No.: US 12,627,146 B2
(45) Date of Patent: May 12, 2026

(54) ELECTRIC POWER INTERCHANGE METHOD, ELECTRIC POWER INTERCHANGE SYSTEM, AND RECORDING MEDIUM

(71) Applicant: Panasonic Intellectual Property Corporation of America, Torrance, CA (US)

(72) Inventors: Kotaro Sakata, Osaka (JP); Tetsuji Fuchikami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 356 days.

(21) Appl. No.: 18/538,403

(22) Filed: Dec. 13, 2023

(65) Prior Publication Data

US 2024/0113521 A1       Apr. 4, 2024

Related U.S. Application Data

(63) Continuation       of       application       No. PCT/JP2022/003595, filed on Jan. 31, 2022.

(30) Foreign Application Priority Data

Jun. 28, 2021     (JP) ................................. 2021-106664

(51) Int. Cl.
*H02J 3/00*          (2026.01)
*G06Q 50/06*        (2012.01)
*H02J 3/32*          (2006.01)
(52) U.S. Cl.
CPC .............. *H02J 3/003* (2020.01); *G06Q 50/06* (2013.01); *H02J 3/32* (2013.01)

(58) Field of Classification Search
CPC ............. G06Q 50/06; H02J 3/003; H02J 3/32
See application file for complete search history.

(56) References Cited

U.S. PATENT DOCUMENTS

2018/0186246 A1     7/2018  Kudo et al.
2018/0216947 A1     8/2018  Sakata et al.
(Continued)

FOREIGN PATENT DOCUMENTS

JP          2011-142779          7/2011
JP          2011-191266          9/2011
(Continued)

OTHER PUBLICATIONS

International Search Report (ISR) issued on Mar. 22, 2022 in International (PCT) Application No. PCT/JP2022/003595.

*Primary Examiner* — James Sanders
(74) *Attorney, Agent, or Firm* — Wenderoth, Lind & Ponack, L.L.P.

(57)          ABSTRACT

The method includes obtaining first information including electric power supply and demand conditions of one or more first consumers managed by a first aggregator; obtaining second information including electric power supply and demand conditions of one or more second consumers managed by a second aggregator; when a deficit or surplus in the electric power supply and demand is detected in the one or more first consumers based on the first information, creating an operation plan of the electric-powered vehicle based on the first information and the second information, the moving plan enabling electric power to be interchanged between the one or more second consumers and, among the one or more first consumers, one target consumer detected to have the deficit or surplus and; and transmitting the operation plan created.

12 Claims, 11 Drawing Sheets

(56)                    References Cited

U.S. PATENT DOCUMENTS

| | | |
|---|---|---|
| 2018/0218459  A1 | 8/2018 | Yokoyama et al. |
| 2023/0191941  A1 | 6/2023 | Naito et al. |

FOREIGN PATENT DOCUMENTS

| | | |
|---|---|---|
| JP | 2012-200065 | 10/2012 |
| JP | 2013-93991 | 5/2013 |
| JP | 5456002 | 3/2014 |
| JP | 5565351 | 8/2014 |
| JP | 5569064 | 8/2014 |
| JP | 2017-103938 | 6/2017 |
| JP | 2018-124674 | 8/2018 |
| JP | 2018-124974 | 8/2018 |
| JP | 6402256 | 10/2018 |
| JP | 2018-173977 | 11/2018 |
| JP | 2019-45370 | 3/2019 |
| JP | 6534403 | 6/2019 |
| JP | 6541560 | 7/2019 |
| WO | 2017/009978 | 1/2017 |
| WO | 2022/044427 | 3/2022 |

FIG. 4

| Resource aggregator | Reliability |
|---|---|
| Resource aggregator B | 95% |
| Resource aggregator C | 80% |
| Resource aggregator D | 50% |
| ⋮ | ⋮ |

|  | Consumer A1 | Consumer A2 | Consumer A3 |
|---|---|---|---|
| Supply and demand balance of electric power | -40 kW (Deficit) | -5 kW (Deficit) | -80 kW (Deficit) |

|  | Consumer A1 | Consumer A2 | Consumer A3 |
|---|---|---|---|
| Supply and demand balance of electric power | +20 kW (Excess) | 0 kW | -80 kW (Deficit) |

FIG. 8

| | Consumer B1 | Consumer B2 | Consumer B3 | Consumer C1 | Consumer C2 | Consumer C3 |
|---|---|---|---|---|---|---|
| Supply and demand balance of electric power | +30 kW (Surplus) | 0 kW | +20 kW (Surplus) | 0 kW | +10 kW (Surplus) | +50 kW (Surplus) |
| Position information | Longitude: B11 Latitude: B12 | Longitude: B21 Latitude: B22 | Longitude: B31 Latitude: B32 | Longitude: C11 Latitude: C12 | Longitude: C21 Latitude: C22 | Longitude: C31 Latitude: C32 |

FIG. 9

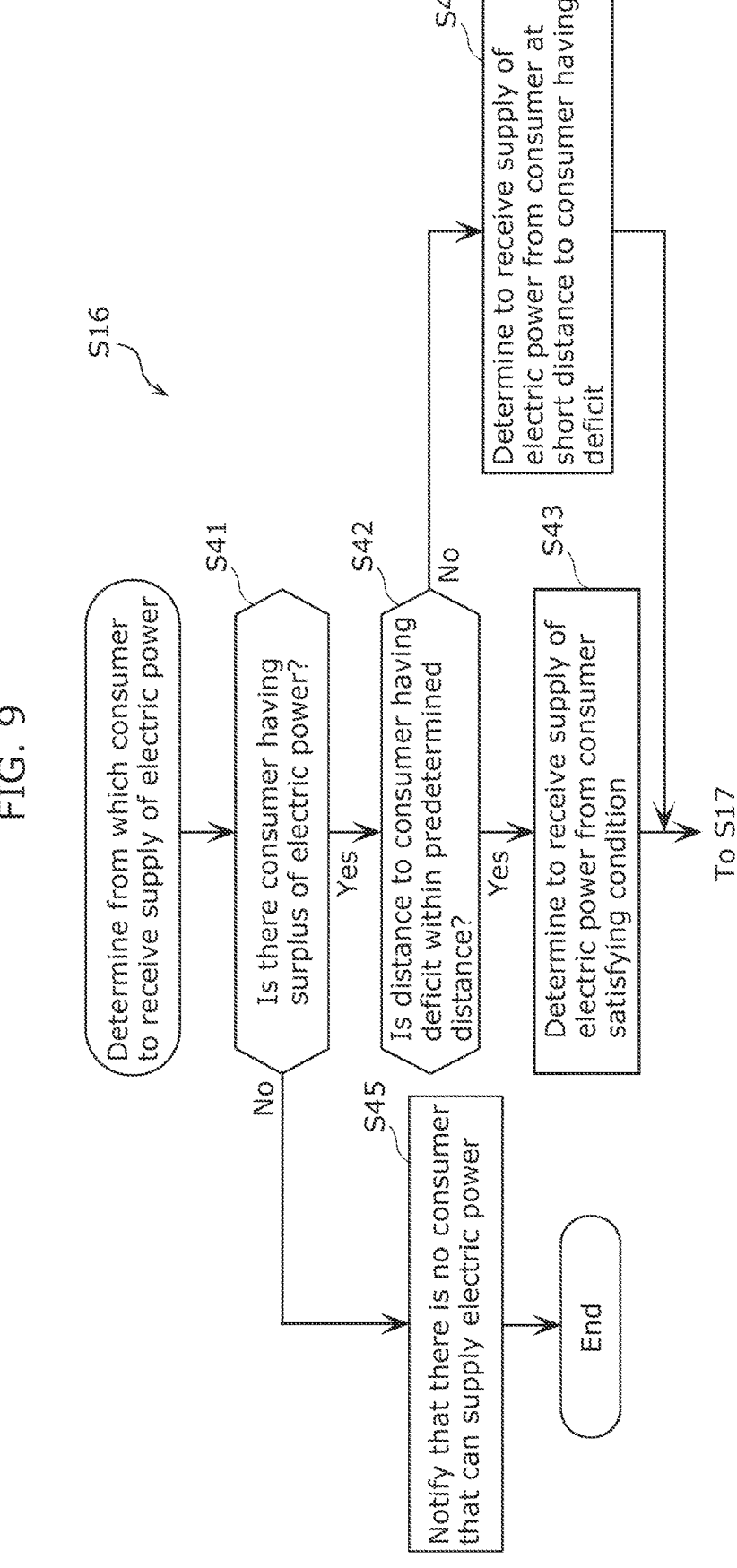

S16

Determine from which consumer to receive supply of electric power

S41
Is there consumer having surplus of electric power?

No → S45
Notify that there is no consumer that can supply electric power

End

Yes

S42
Is distance to consumer having deficit within predetermined distance?

No → S44
Determine to receive supply of electric power from consumer at short distance to consumer having deficit Yes S43
Determine to receive supply of electric power from consumer satisfying condition To S17

ELECTRIC POWER INTERCHANGE METHOD, ELECTRIC POWER INTERCHANGE SYSTEM, AND RECORDING MEDIUM

CROSS REFERENCE TO RELATED APPLICATIONS

This is a continuation application of PCT International Application No. PCT/JP2022/003595 filed on Jan. 31, 2022, designating the United States of America, which is based on and claims priority of Japanese Patent Application No. 2021-106664 filed on Jun. 28, 2021. The entire disclosures of the above-identified applications, including the specifications, drawings and claims are incorporated herein by reference in their entirety.

FIELD

The present disclosure relates to an electric power interchange method, an electric power interchange system, and a recording medium.

BACKGROUND

In recent years, challenges of conventional, large-scale, centralized energy systems have become more apparent, and introduction of renewable energy has expanded. Such circumstances have promoted a shift to distributed energy systems that utilize relatively small-scale, locally dispersed energy resources. For example, distributed energy resources are becoming increasingly widespread among consumers—including cogeneration, such as photovoltaic electricity generation or household fuel cells; storage batteries; electric vehicles; or negawatts (electric power saved).

These distributed energy resources in homes or factories are each small in scale. Yet, a system or a concept called "virtual power plant (VPP)" is being proposed. In VPP, distributed energy resources in homes or factories are aggregated through advanced energy management technologies utilizing the Internet of Things (IoT), and controlled remotely and integrally. Thus, VPP is used to adjust the supply and demand balance of electric power and functions like a single power plant.

With an electric power interchange system that uses a system such as VPP, it is contemplated to interchange electric power between two or more consumers in order to adjust the supply and demand balance of electric power. For example, Patent Literature (PTL) 1 discloses an electric power supply planning apparatus that, with the use of information about facilities where a vehicle can be charged and facilities where the electric power in the vehicle is to be used, creates a plan to move the vehicle to each of the facilities.

CITATION LIST

Patent Literature

PTL 1: Japanese Patent No. 6541560

SUMMARY

Technical Problem

The technique described in PTL 1, however, has room for improvement in adjusting the supply and demand balance of electric power.

Accordingly, the present disclosure provides an electric power interchange method, an electric power interchange system, and a recording medium that are each capable of further improving the supply and demand balance of electric power.

Solution to Problem

An electric power interchange method according to one aspect of the present disclosure is an electric power interchange method of interchanging electric power with use of a mobile body provided with a storage battery. The electric power interchange method uses a first aggregator that manages electric power supply and demand of one or more first consumers and a second aggregator that manages electric power supply and demand of one or more second consumers different from the one or more first consumers. The electric power interchange method includes: first obtaining of obtaining first information that includes electric power supply and demand conditions of each of the one or more first consumers managed by the first aggregator; second obtaining of obtaining second information that includes electric power supply and demand conditions of each of the one or more second consumers managed by the second aggregator; when a deficit or a surplus in the electric power supply and demand is detected in the one or more first consumers based on the first information, creating a moving plan of the mobile body based on the first information and the second information, the moving plan enabling electric power to be interchanged between the one or more second consumers and, among the one or more first consumers, one target consumer detected to have the deficit or the surplus; and transmitting the moving plan created.

An electric power interchange system according to one aspect of the present disclosure is an electric power interchange system that interchanges electric power with use of a mobile body provided with a storage battery. The electric power interchange system using a first aggregator that manages electric power supply and demand of one or more first consumers and a second aggregator that manages electric power supply and demand of one or more second consumers different from the one or more first consumers. The electric power interchange system includes: a first obtainer that obtains first information that includes electric power supply and demand conditions of each of the one or more first consumers managed by the first aggregator; a second obtainer that obtains second information that includes electric power supply and demand conditions of each of the one or more second consumers managed by the second aggregator; a creator that, when a deficit or a surplus in the electric power supply and demand is detected in the one or more first consumers based on the first information, creates a moving plan of the mobile body based on the first information and the second information, the moving plan enabling electric power to be interchanged between the one or more second consumers and, among the one or more first consumers, one target consumer detected to have the deficit or the surplus; and a transmitter that transmits the moving plan created.

A recording medium according to one aspect of the present disclosure is a non-transitory computer-readable recording medium having a program recorded thereon for causing a computer to execute the electric power interchange method above.

Advantageous Effects

One aspect of the present disclosure can bring about an electric power interchange method and so forth that are capable of further improving the supply and demand balance of electric power.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 is a diagram showing other resource aggregators' reliability stored in a storage according to an embodiment.

FIG. 8 is a diagram showing one example of electric power supply and demand information of groups of consumers of other resource aggregators according to an embodiment.

FIG. 9 is a flowchart showing the details of step S16 of FIG. 5.

DESCRIPTION OF EMBODIMENTS (Underlying Knowledge Forming Basis of the Present Disclosure)

Figure 1:
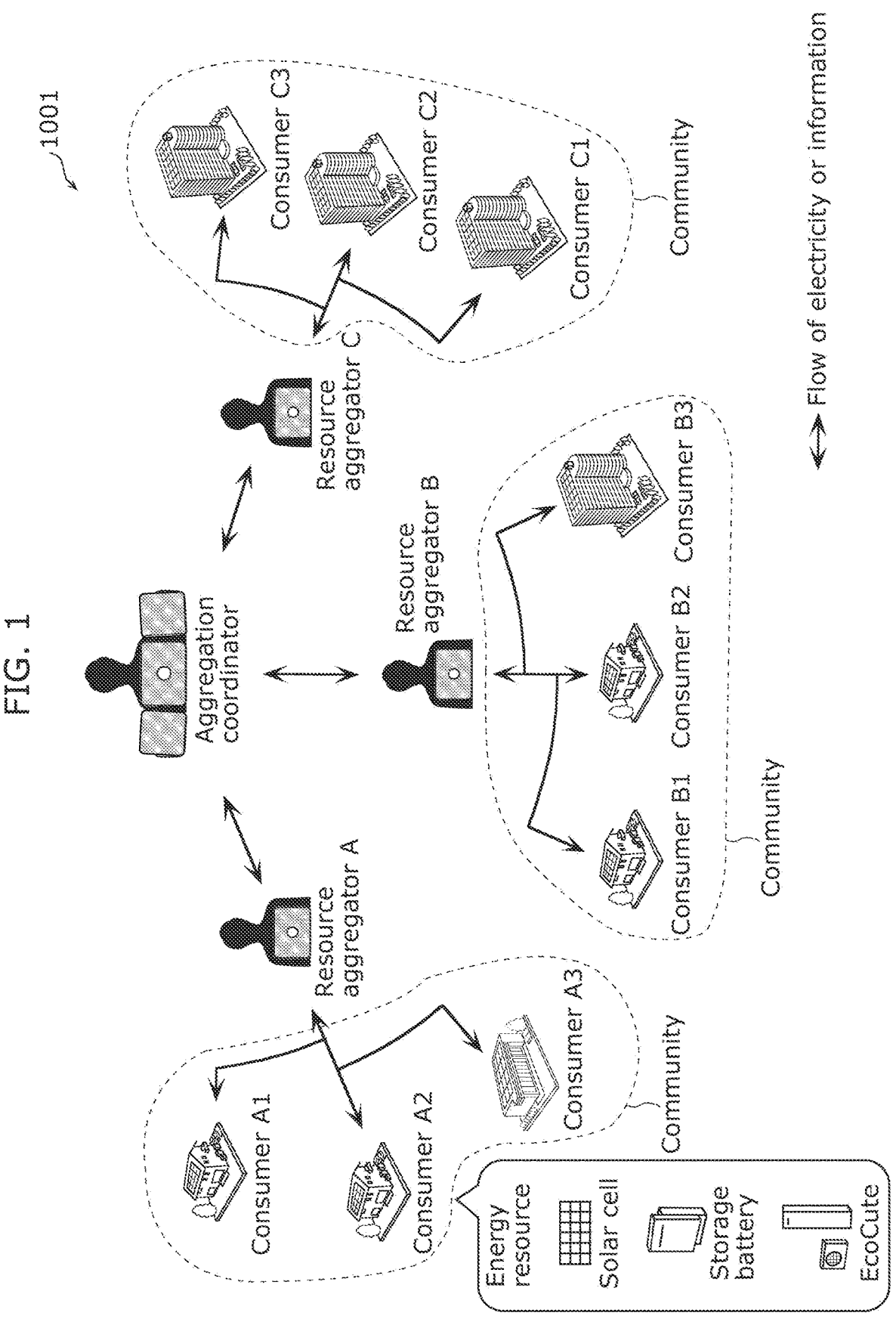
FIG. 1 is a diagram showing an outline of an electric power interchange system according to a comparative example.

Prior to the description of the present disclosure, some underlying knowledge forming the basis of the present disclosure will be described with reference to FIG. 1 and FIG. 2. First, an outline of a virtual power plant (VPP) will be described with reference to FIG. 1. FIG. 1 is a diagram showing an outline of electric power interchange system 1001 according to a comparative example.

As shown in FIG. 1, electric power interchange system 1001 includes communities, resource aggregators, and an aggregation coordinator. It is to be noted that the number of communities, the number of resource aggregators, and the number of aggregation coordinators to be included in electric power interchange system 1001 are not limited to those shown in FIG. 1. Furthermore, a resource aggregator and an aggregation coordinator may be collectively referred to as an electric power aggregator or an aggregator.

Each of the communities is composed of a plurality of consumers. In the example shown in FIG. 1, three communities are formed by consumers A1 to A3, consumers B1 to B3, and consumers C1 to C3. A community is composed, for example, of one or more consumers that a resource aggregator manages. Resource aggregator A manages the electric power supply and demand of consumers A1 to A3, resource aggregator B manages the electric power supply and demand of consumers B1 to B3, and resource aggregator C manages the electric power supply and demand of consumers C1 to C3. Resource aggregators A to C manage the electric power supply and demand of mutually different one or more consumers. It is to be noted that the number of consumers forming a community is not limited to three.

At least one of a plurality of consumers may have an energy resource, including a solar cell (electricity generating equipment), a storage battery (storage battery equipment), or an electric water heater (hot water storage equipment) that uses a heat pump technology, such as EcoCute (registered trademark).

A resource aggregator and an aggregation coordinator are service providers that integrally control, for example, the energy resources or distributed energy resources on the consumer side and provide an energy service from a virtual power plant (VPP). In other words, a resource aggregator and an aggregation coordinator are service providers that supply energy to a plurality of consumers. A resource aggregator is provided, for example, for each community and controls the electric power used by a plurality of consumers in the community. Electric power and information are transmitted and received between a resource aggregator and a plurality of consumers. It is to be noted that VPP is a system that integrally controls pieces of electricity generating equipment, energy resources, and so forth dispersed over an electric power grid so that such equipment and resources function like a single power plant (a virtual power plant).

For example, information pertaining to the amount of electricity generated by electricity generating equipment is transmitted to a resource aggregator from a consumer that owns that electricity generating equipment. Meanwhile, information pertaining to the amount of electric power a consumer is assigned to save is transmitted from a resource aggregator to that consumer.

An aggregation coordinator aggregates the amount of electric power controlled by resource aggregators and trades the electric power with companies known as electric power companies, such as electric power transmission and distribution companies or retail electricity providers. In the following description, a resource aggregator and an aggregation coordinator may collectively be referred to as an aggregator.

With such electric power interchange system 1001, it is contemplated to interchange electric power between two or more consumers that a resource aggregator manages. For example, PTL 1 discloses an electric power supply planning apparatus that, with the use of information about facilities where a vehicle can be charged and facilities where the electric power in the vehicle is to be used, creates a plan to move the vehicle to each of the facilities. Although such an apparatus can improve the supply and demand balance of electric power, its advantageous effects are limitative if, for example, electric power has already been interchanged between two or more consumers that a resource aggregator manages.

The electric power interchange according to the comparative example will be further described with reference to FIG. 2. FIG. 2 is a schematic diagram showing one example of electric power interchange in electric power interchange system 1001 according to the comparative example. FIG. 2 shows a case of electric power interchange that takes place when, of consumers A1 to A3 that resource aggregator A manages, consumers A1 and A2 have an electric power surplus (excess electric power) and consumers A3 is experiencing an electric power crunch. One example of factors that cause an electric power crunch is an occurrence of a power failure, but this is not a limiting example, and other examples include a fluctuation in the amount of electric power generated from natural energy caused, for example, by a sudden change in weather conditions (e.g., the actual amount of electric power generated is smaller than the predicted amount of electric power to be generated) or an occurrence of a natural disaster, such as an earthquake or a torrential rainfall.

Figure 2:
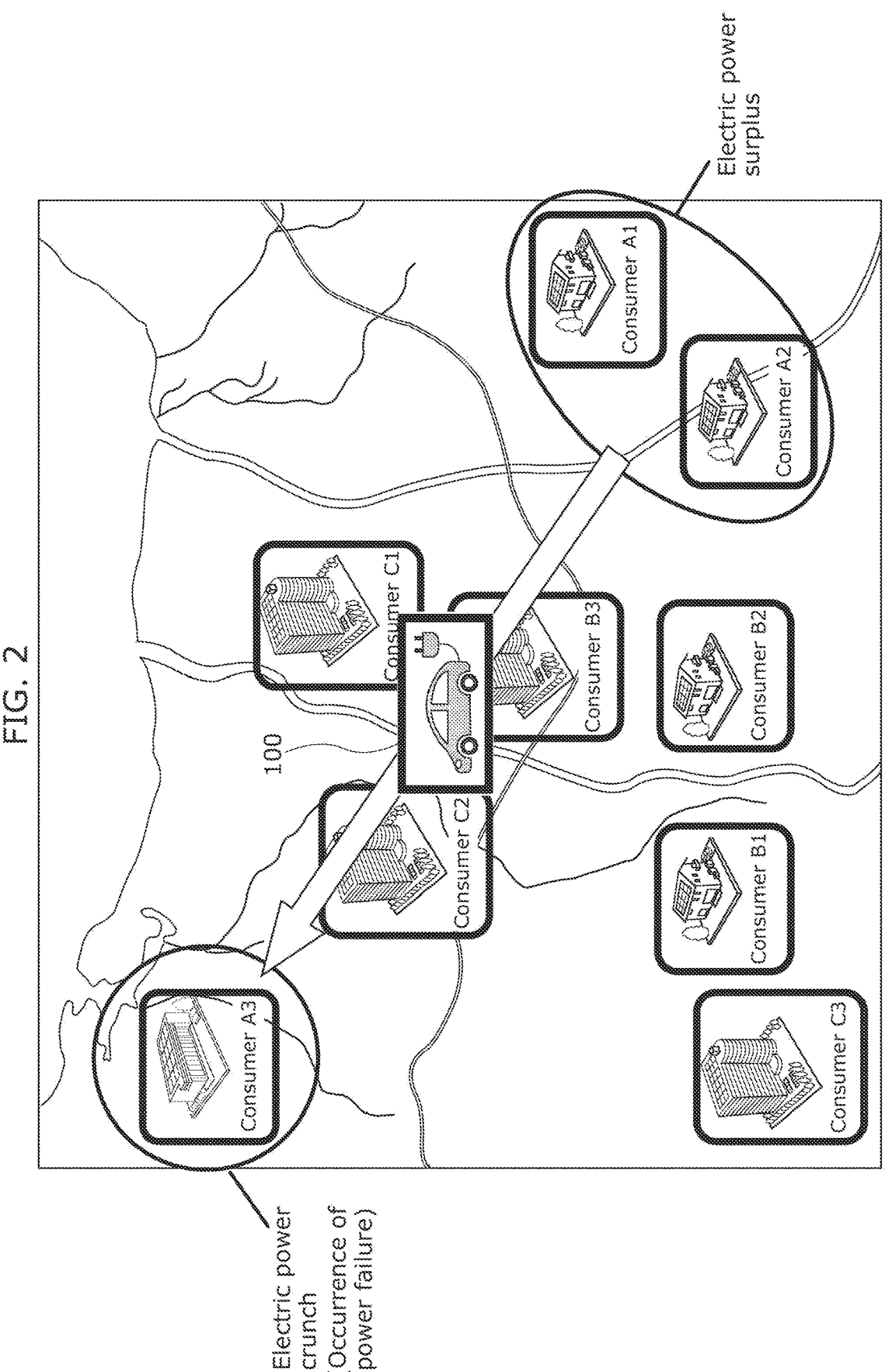
FIG. 2 is a schematic diagram showing one example of electric power interchange in the electric power interchange system according to the comparative example.

As shown in FIG. 2, consumers A3 receives, via electric-powered vehicle 100, a supply of electric power from consumers A1 and A2, that belong to the same group (the same group of consumers) and have an electric power surplus. In this manner, in the comparative example, electric power is interchanged within the group of consumers that resource aggregator A manages.

However, there may be a case in which the supply and demand balance of electric power is improved if consumer A3 receives a supply of electric power not from consumer A1 or A2 but, for example, from one or more consumers among consumers B1 to B3 and consumers C1 to C3. In other words, there may be a case in which the supply and demand balance of electric power is improved if a consumer that resource aggregator A manages receives a supply of electric power from a consumer that a resource aggregator other than resource aggregator A manages. Examples of such a case include a case in which neither consumer A1 nor consumer A2 has an electric power surplus or a case in which one or more consumers among consumers B1 to B3 and consumers C1 to C3 have a larger amount of electric power surplus than consumers A1 and A2.

In this manner, the method of interchanging electric power illustrated according to the comparative example has room for improvement. Accordingly, the inventors of the present application have diligently examined electric power interchange methods and so forth that can further improve the supply and demand balance of electric power and have devised the electric power interchange method and so forth described hereinafter. Specifically, with the devised electric power interchange method and so forth, when the supply and demand balance of electric power is not stable, resource aggregators A to C shown in FIG. 1 may coordinate in the electric power interchange, and such coordination enables the consumers of these resource aggregators to interchange electric power therebetween beyond their own groups and can optimize the supply and demand balance of electric power across the groups (e.g., attain increased energy efficiency in a region). It is to be noted that PTL 1 does not disclose the interchange of electric power between resource aggregators.

An electric power interchange method according to one aspect of the present disclosure is an electric power interchange method of interchanging electric power with use of a mobile body provided with a storage battery. The electric power interchange method uses a first aggregator that manages electric power supply and demand of one or more first consumers and a second aggregator that manages electric power supply and demand of one or more second consumers different from the one or more first consumers. The electric power interchange method includes first obtaining of obtaining first information that includes electric power supply and demand conditions of each of the one or more first consumers managed by the first aggregator; second obtaining of obtaining second information that includes electric power supply and demand conditions of each of the one or more second consumers managed by the second aggregator; when a deficit or a surplus in the electric power supply and demand is detected in the one or more first consumers based on the first information, creating a moving plan of the mobile body based on the first information and the second information, the moving plan enabling electric power to be interchanged between the one or more second consumers and, among the one or more first consumers, one target consumer detected to have the deficit or the surplus; and transmitting the moving plan created.

With the above, the electric power interchange method enables electric power to be interchanged between two aggregators (between two groups). In other words, the electric power interchange method enables the supply and demand balance of electric power to be adjusted across two groups, and thus the supply and demand balance of electric power can be further improved, as compared to a case in which electric power is interchanged between consumers of a single aggregator (within a single group).

Furthermore, for example, in the creating of the moving plan, when the one target consumer has a surplus in the electric power supply and demand, the moving plan may be created to enable the mobile body to be charged at electric power equipment of the one target consumer and charged electric power to be supplied to electric power equipment of, among the one or more second consumers, a consumer having a deficit in the electric power supply and demand as obtained based on the second information, or when the one target consumer has a deficit in the electric power supply and demand, the moving plan may be created to enable the mobile body to be charged at electric power equipment of, among the one or more second consumers, a consumer having a surplus in the electric power supply and demand as obtained based on the second information and charged electric power to be supplied to electric power equipment of the one target consumer.

With the above, even when either a deficit or a surplus in the electric power supply and demand is detected in the one target consumer, this deficit of surplus can be reduced.

Furthermore, for example, the electric power interchange method may further include first determining of performing matching in electric power interchange between the one target consumer and the one or more second consumers based on the first information and the second information and, based on the matching, determining, among the one or more second consumers, an other target consumer that is to interchange electric power with the one target consumer. In the creating of the moving plan, the moving plan may be created to enable electric power to be interchanged between the one target consumer and the other target consumer determined in the first determining.

With the above, electric power can be interchanged between consumers matched in the electric power interchange. In other words, the supply and demand balance of electric power can be improved at each of the one target consumer and the other target consumer. Therefore, the supply and demand balance of electric power can be further improved, as compared to a case in which such matching is not performed.

Furthermore, for example, in the first determining, a first amount of electric power in one of the deficit or the surplus detected of the one target consumer may be obtained based on the first information, a consumer whose second amount of electric power defined as a total amount of electric power in an other of the deficit or the surplus equals the first amount of electric power may be selected from the one or more second consumers based on the second information, and the consumer selected may be determined as the other target consumer.

The above makes it possible to achieve a state in which neither a deficit nor a surplus in the electric power interchange occurs at the one target consumer.

Furthermore, for example, the electric power interchange method may further include third obtaining of obtaining position information indicating a position of the one target consumer, a position of the other target consumer, and a position of the mobile body. In the creating of the moving plan, the moving plan may be created based further on the position information.

With the above, a traveling route for more efficient electric power transportation can be created in accordance with the position of the one target consumer, the position of the other target consumer, and the position of the mobile body. Therefore, the electric power interchange can be implemented with less electric power, and the supply and demand balance of electric power can be further improved.

Furthermore, for example, in the first determining, the other target consumer may be determined from at least one second consumer that is within a predetermined distance to the one target consumer, out of the one or more second consumers, the at least one second consumer being included in the one or more second consumers.

With the above, the amount of electric power consumed by the mobile body during the transportation of the electric power can be reduced. Therefore, the electric power interchange can be implemented with less electric power, and the supply and demand balance of electric power can be further improved.

Furthermore, for example, a third aggregator may manage electric power supply and demand of one or more third consumers, the second information may further include electric power supply and demand conditions of each of the one or more third consumers managed by the third aggregator, and in the creating of the moving plan, the moving plan may be created to enable electric power to be interchanged between the one target consumer and the one or more second consumers and one or more third consumers.

With the above, the electric power interchange method enables electric power to be interchanged between three aggregators (between three groups) and can thus even further improve the supply and demand balance of electric power.

Furthermore, for example, the electric power interchange method may further include second determining of obtaining a reliability of each of three or more aggregators, including the second aggregator and the third aggregator, in a prediction of the electric power supply and demand conditions and, based on the reliability, determining, from the three or more aggregators, one or more aggregators with which to interchange electric power. In the creating of the moving plan, the moving plan may be created to enable for electric power interchange with consumers managed by the one or more aggregators determined in the second determining.

The above can prevent interchange of electric power with a resource aggregator with a low reliability, and thus the deficit or the surplus in the electric power supply and demand can be resolved more reliably. Therefore, the supply and demand balance of electric power can be improved more reliably.

Furthermore, for example, the mobile body may be a vehicle equipped with a self-driving function.

The above enables electric power to be transported automatically.

Furthermore, for example, the second obtaining may be executed when the deficit or the surplus in the electric power supply and demand is detected in the one or more first consumers based on the first information.

The above makes it possible to obtain the second information only when the second information is necessary. Therefore, any increase in the communication load in the communication for the electric power interchange can be prevented.

Furthermore, an electric power interchange system according to one aspect of the present disclosure is an electric power interchange system that interchanges electric power with use of a mobile body provided with a storage battery. The electric power interchange system using a first aggregator that manages electric power supply and demand of one or more first consumers and a second aggregator that manages electric power supply and demand of one or more second consumers different from the one or more first consumers. The electric power interchange system includes a first obtainer that obtains first information that includes electric power supply and demand conditions of each of the one or more first consumers managed by the first aggregator; a second obtainer that obtains second information that includes electric power supply and demand conditions of each of the one or more second consumers managed by the second aggregator; a creator that, when a deficit or a surplus in the electric power supply and demand is detected in the one or more first consumers based on the first information, creates a moving plan of the mobile body based on the first information and the second information, the moving plan enabling electric power to be interchanged between the one or more second consumers and, among the one or more first consumers, one target consumer detected to have the deficit or the surplus; and a transmitter that transmits the moving plan created.

The above provides advantageous effects similar to those provided by the electric power interchange method described above.

Hereinafter, embodiments will be described in specific terms with reference to the drawings.

It is to be noted that the embodiments described below merely illustrate general or specific examples. The numerical values, the shapes, the constituent elements, the arrangement positions and the connection modes of the constituent elements, the steps, the order of the steps, and so forth illustrated in the following embodiments are examples and are not intended to limit the present disclosure. Among the constituent elements described according to the following embodiments, any constituent elements that are not cited in the independent claims are to be construed as optional constituent elements.

The drawings are schematic diagrams and do not necessarily provide the exact depiction. In the drawings, substantially identical configurations are given identical reference characters, and duplicate description thereof may be omitted or simplified.

In the present specification, expressions, such as "the same", expressing relationships between elements as well as numerical values and numerical ranges are not to be construed solely in their strict senses but to be construed to encompass substantially equal ranges—for example, within a difference of several percentages (e.g., around 5%).

Embodiment

An electric power interchange method and so forth according to the present embodiment will be described below with reference to FIG. 3 to FIG. 12.

[1. Configuration of Electric Power Interchange System]

Figure 3:
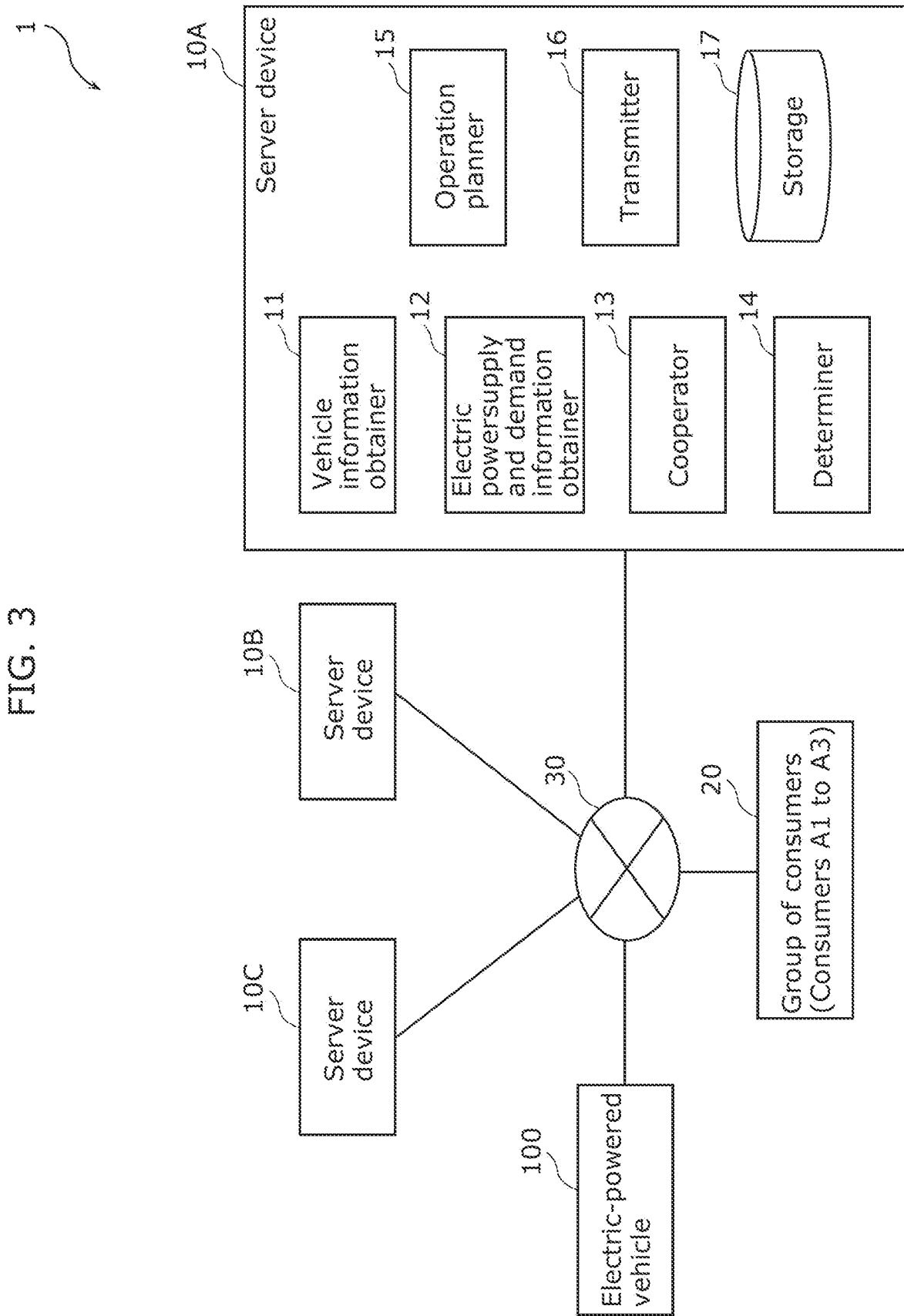
FIG. 3 is a diagram showing a functional configuration of an electric power interchange system according to an embodiment.

First, a configuration of an electric power interchange system will be described with reference to FIG. 3. FIG. 3 is a diagram showing a functional configuration of electric power interchange system 1 according to the present embodiment. Electric power interchange system 1 according to the present embodiment is an energy management system that, with a plurality of consumers forming a group (a community), enables consumers in different groups to interchange electric power therebetween in order to adjust the supply and demand balance of electric power across a plurality of groups. Electric power interchange system 1 can also be regarded as an energy management system that interchanges electric power with the use of electric-powered vehicle 100 provided with a storage battery. Herein, an outline of electric power interchange system 1 according to the present embodiment is like the one shown in FIG. 1, and, in the following description, resource aggregators A to C and consumers A1 to A3, B1 to B3, and C1 to C3 shown in FIG. 1 will be used.

As shown in FIG. 3, electric power interchange system 1 includes server devices 10A to 10C, a group of consumers 20 (e.g., consumers A1 to A3), and electric-powered vehicle 100. Server device 10A is communicably connected, via network 30, to server devices 10B and 10C, the group of consumers 20, and electric-powered vehicle 100. The group of consumers 20 includes one or more first consumers and includes, for example, consumers A1 to A3 shown in FIG. 1.

It is to be noted that there is no particular limitation on the communication scheme of the communication carried out via network 30, and wireless communication or wired communication may be employed. Furthermore, network 30 is, for example, a wide area communication network, such as the internet, but this is not a limiting example.

Server devices 10A to 10C are information processing devices of resource aggregators. Server device 10A is an information processing device of resource aggregator A shown in FIG. 1. Resource aggregator A is one example of a first aggregator that manages the electric power supply and demand of the group of consumers 20 (one example of one or more first consumers). Server device 10B is an information processing device of resource aggregator B shown in FIG. 1. Resource aggregator B is one example of a second aggregator that manages the electric power supply and demand of one or more second consumers (e.g., consumers B1 to B3 shown in FIG. 1). Server device 10C is an information processing device of resource aggregator C shown in FIG. 1. Resource aggregator C is one example of a third aggregator that manages the electric power supply and demand of one or more third consumers (e.g., consumers C1 to C3 shown in FIG. 1). The one or more first consumers, the one or more second consumers, and the one or more third consumers are each a different consumer.

In the following description, server device 10A is also referred to as resource aggregator A, server device 10B is also referred to as resource aggregator B, and server device 10C is also referred to as resource aggregator C.

It is to be noted that, according to the present embodiment, server devices 10B and 10C each have a configuration the same as the configuration of server device 10A, and description thereof will thus be omitted.

Server device 10A includes vehicle information obtainer 11, electric power supply and demand information obtainer 12, cooperator 13, determiner 14, operation planner 15, transmitter 16, and storage 17.

Vehicle information obtainer 11 obtains vehicle information pertaining to electric-powered vehicle 100. Vehicle information includes, for example but not limited to, position information indicating the current position of electric-powered vehicle 100, the battery capacity of a storage battery provided in electric-powered vehicle 100, and the current remaining available capacity of the storage battery. The battery capacity may be indicated by a catalog value or a capacity to which electricity can be stored currently with the degradation over time taken into consideration.

Vehicle information obtainer 11 may obtain vehicle information from electric-powered vehicle 100 or from a server device that manages vehicle information. Vehicle information obtainer 11 includes, for example, a communication circuit (a communication module).

It is to be noted that information pertaining to electric-powered vehicle 100 whose vehicle information is to be obtained may be obtained in advance and stored in storage 17. Vehicle information obtainer 11 may read out such information stored in storage 17 and obtain vehicle information of each of one or more electric-powered vehicles 100 included in the information that vehicle information obtainer 11 has read out.

Electric power supply and demand information obtainer 12 obtains electric power supply and demand information indicating the supply and demand balance of electric power (the electric power supply and demand conditions) from each of the one or more first consumers included in the group of consumers 20 that server device 10A manages. Electric power supply and demand information obtainer 12 obtains electric power supply and demand information, for example, periodically, but such an obtaining timing is not limited to be periodic. Based on the obtained electric power supply and demand information, electric power supply and demand information obtainer 12 may predict the electric power supply and demand to be expected of each consumer after a passage of a predetermined length of time. The electric power supply and demand may be predicted through any known techniques and may be predicted based, for example, on data on past electric power supply and demand (data on the amount of electric power generated in the past and on the amount of electric power consumed in the past) or on the weather conditions expected in a predetermined length of time (e.g., the amount of solar radiation, the amount of wind, etc.). Electric power supply and demand information obtainer 12 includes, for example, a communication circuit (a communication module).

It is to be noted that, in the following description, the electric power supply and demand information that electric power supply and demand information obtainer 12 obtains, that is, the electric power supply and demand information of a consumer or consumers within the same group is also referred to as first information. Meanwhile, electric power supply and demand information obtainer 12 is one example of a first obtainer.

Cooperator 13 obtains, from other resource aggregators (e.g., resource aggregators B and C), electric power supply and demand information indicating the electric power supply and demand of each of the one or more consumers that the other resource aggregators manage. Cooperator 13 is a processor for sharing electric power supply and demand information of consumers with other resource aggregators.

It is to be noted that, in the following description, the electric power supply and demand information that cooperator 13 obtains, that is, the electric power supply and demand information of a consumer or consumers in another group or other groups is also referred to as second information. Meanwhile, cooperator 13 is one example of a second obtainer.

Determiner 14 determines whether at least one of a deficit or a surplus (an excess) in the electric power supply and demand is occurring in the group of consumers 20 that server device 10A manages, based on the first information of each of the one or more first consumers included in the group of consumers 20. This can be rephrased that, based on the first information, determiner 14 detects a consumer that has a deficit in the electric power supply and demand or a consumer that has a surplus in the electric power supply and demand.

When determiner 14 has detected, based on the first information, a deficit or a surplus in the electric power supply and demand in the group of consumers 20, operation planner 15, based on the first information and the second information, creates an operation plan of electric-powered vehicle 100 for electric power interchange so as to resolve the deficit or the surplus in the electric power supply and demand. Operation planner 15 creates an operation plan of electric-powered vehicle 100 so as to interchange electric power, for example, between a consumer (one target consumer) detected, from among the one or more first consumers, to have a deficit or a surplus in the electric power supply and demand and one or more consumers (e.g., one or more second consumers, one or more third consumers, etc.) that other resource aggregators manage. It is to be noted that operation planner 15 is one example of a creator and an operation plan is one example of a moving plan.

Transmitter 16 transmits an operation plan that operation planner 15 has created. Transmitter 16 may, for example, transmit the operation plan to a terminal device of a user who operates (e.g., drives or remotely operates) electric-powered vehicle 100 or is an occupant of electric-powered vehicle 100, or, if electric-powered vehicle 100 is equipped with a self-driving function, transmitter 16 may, for example, transmit the operation plan to electric-powered vehicle 100. Transmitter 16 includes, for example, a communication circuit (a communication module).

Storage 17 is a storage device that stores, for example but not limited to, a control program for the constituent elements of server device 10A to operate or information necessary for electric power interchange. Storage 17 is implemented by, for example, a semiconductor memory.

Information necessary for electric power interchange may include, for example, a list of other resource aggregators that manage consumers in the surrounding area of the group of consumers 20 that server device 10A manages. Furthermore, information necessary for electric power interchange may include, for example but not limited to, the position information of each of the consumers that resource aggregator A manages or the battery capacity of electricity storing equipment. Furthermore, information necessary for electric power interchange may include history information indicating the predicted value of the electric power supply and demand of other resource aggregators and the actual value of the electric power supply and demand of the other resource aggregators or information pertaining to the other resource aggregators' reliability.

Such history information is obtained, for example, from each of the other resource aggregators. The reliability is information indicating the accuracy of the predicted value predicted by each server device of the electric power supply and demand of the consumers that the server device manages. The reliability is calculated based, for example but not limited to, on a difference between the past predicted value predicted by a server device of the electric power supply and demand and the measured value of the electric power supply and demand observed at that time. For example, the reliability takes a higher value as the difference between the predicted value and the measured value is smaller. FIG. 4 is a diagram showing the other resource aggregators' reliability stored in storage 17 according to the present embodiment.

As shown in FIG. 4, storage 17 stores the reliability of each of the other resource aggregators that manage the consumers in the surrounding area of the group of consumers 20 that server device 10A manages. In the example shown in FIG. 4, resource aggregator B (server device 10B) has a reliability of 95%, resource aggregator C (server device 10C) has a reliability of 80%, and resource aggregator D (not shown) has a reliability of 50%.

The group of consumers 20 receives a supply of electric power from resource aggregator A. The group of consumers 20 includes, for example, one or more consumers (users) that use electric power and may be, for example but not limited to, a home, a store, or a company having an electrical apparatus. The group of consumers 20 may also be, for example, an organization having a plurality of facilities, such as a university. Herein there is no particular limitation on an electrical apparatus as long as that apparatus is remotely operable (e.g., the Internet of Things (IoT) apparatus), and examples of such include a lighting apparatus and an air conditioner.

Herein, at least one of the one or more consumers (also referred to as consumers) that each resource aggregator manages may own, for example, electricity generating equipment, electricity storing equipment, or hot water supplying equipment. Electricity generating equipment as used herein may be electricity generating equipment that can generate, for example, renewable energy. Furthermore, electricity generating equipment may be electricity generating equipment whose amount of generated electric power changes by the weather conditions. Electricity generating equipment is, for example but not limited to, photovoltaic electricity generating equipment or wind-powered electricity generating equipment. Electricity generating equipment may include, for example, at least photovoltaic electricity generating equipment. Meanwhile, a consumer may own a plurality of items of electricity generating equipment.

Herein, it suffices that at least one consumer among a plurality of consumers of electric power interchange system 1 own electricity generating equipment.

Electric-powered vehicle 100 is one example of a mobile body provided with a storage battery. Electric-powered vehicle 100 is charged at a consumer having a surplus in the electric power supply and demand and supplies the charged electric power to a consumer having a deficit in the electric power supply and demand. Electric-powered vehicle 100 is an electric vehicle that is driven and runs on the electric power of the storage battery provided therein. An electric vehicle includes, for example but not limited to, a battery electric vehicle (BEV) capable of running only on electricity without gasoline or a plug-in hybrid vehicle (PHV) provided with an engine and capable of running on both electricity and gasoline.

Electric-powered vehicle 100 may be a vehicle equipped with a self-driving function or may be a manually driven vehicle. Furthermore, electric-powered vehicle 100 may be a vehicle dedicated to electric power interchange or a vehicle owned by any of the consumers (e.g., any consumer among consumers A1 to A3, B1 to B3, and C1 to C3). A dedicated vehicle may, for example, stand by at a location set in advance. Furthermore, the standby location of such a dedicated vehicle may be stored in storage 17 of server device 10A.

Electric-powered vehicle 100 may include, for example but not limited to, a sensor that measures the amount of electricity stored or a global positioning system (GPS) sensor.

[2. Operation of Electric Power Interchange System]

Figure 5:
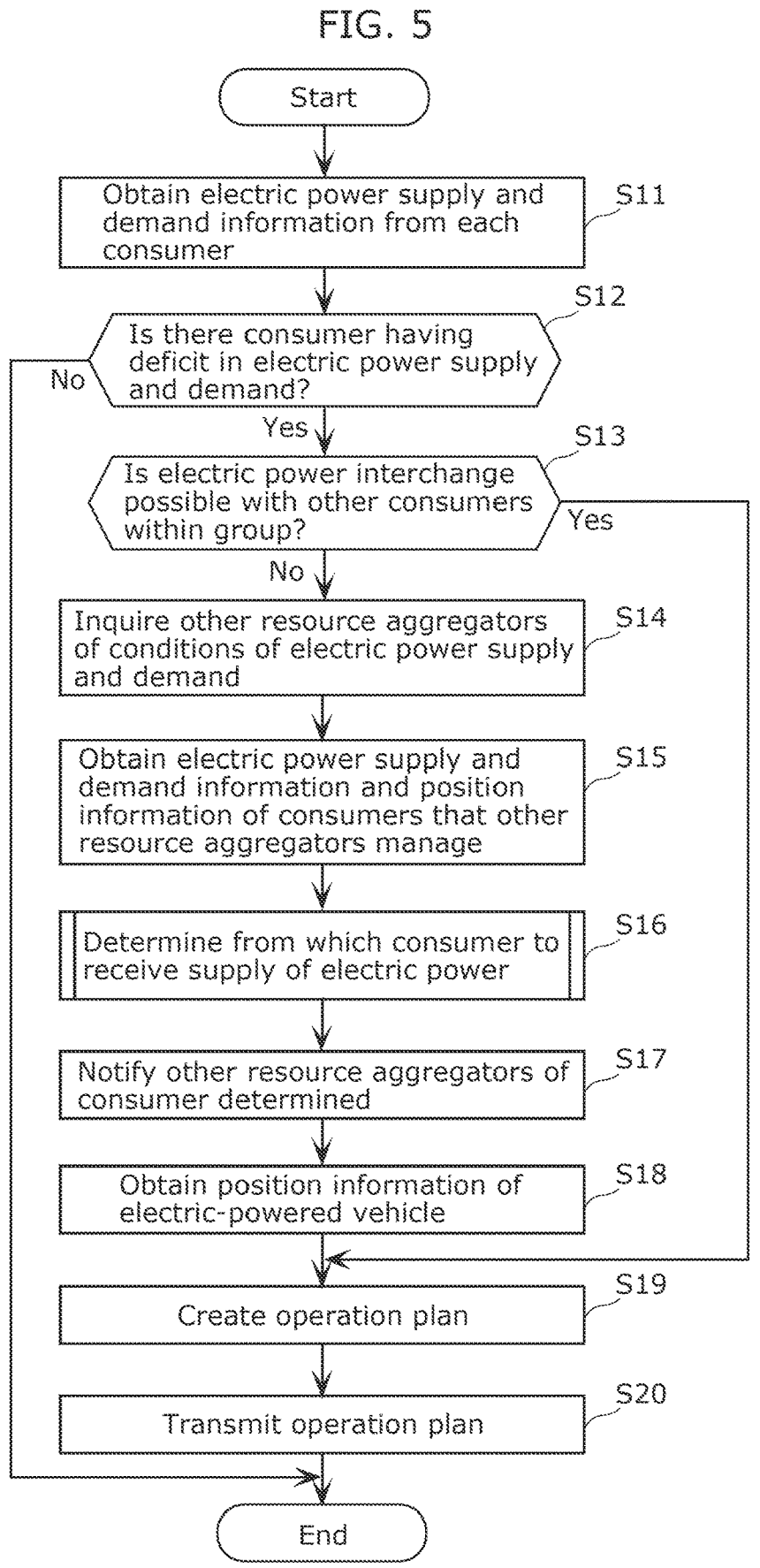
FIG. 5 is a flowchart showing one example of an operation of an electric power interchange system according to an embodiment.

An operation of electric power interchange system 1 configured as described above will be described with reference to FIG. 5 to FIG. 12. FIG. 5 is a flowchart showing one example of an operation (an electric power interchange method) of electric power interchange system 1 according to the present embodiment. Specifically, FIG. 5 shows an operation of server device 10A. In the example described with reference to FIG. 5, a consumer of resource aggregator A has a deficit in the electric power supply and demand, and that consumer receives a supply of electric power from a consumer or consumers of each of resource aggregators B and C. Alternatively, a consumer that has a deficit in the electric power supply and demand may receive a supply of electric power from a consumer or consumers of only one of resource aggregator B or C. Receiving a supply of electric power is one example of interchanging electric power.

As shown in FIG. 5, electric power supply and demand information obtainer 12 of server device 10A obtains electric power supply and demand information (first information) from each of the consumers included in the group of consumers 20 (S11). Electric power supply and demand information obtainer 12 obtains the electric power supply and demand information including the supply and demand balance of electric power of each of consumers A1 to A3 (one example of one or more first consumers) that resource aggregator A (one example of a first aggregator) manages. The supply and demand balance of electric power is information that is based, for example, on the amount of electric power consumed and the amount of electric power generated. Electric power supply and demand information obtainer 12 outputs the obtained electric power supply and demand information to determiner 14. Step S11 is one example of a first obtaining step.

Figures 6A, 6B, 7:
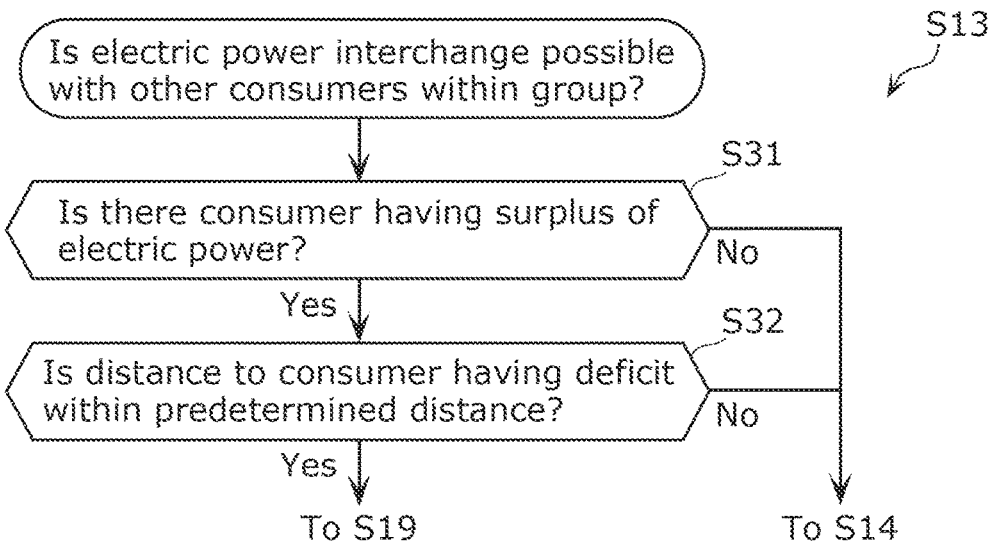
FIG. 6A is a diagram showing one example of electric power supply and demand information of a group of consumers according to an embodiment.
FIG. 6B is a diagram showing another example of electric power supply and demand information of a group of consumers according to an embodiment.
FIG. 7 is a flowchart showing the details of step S13 of FIG. 5.

Electric power supply and demand information will now be described with reference to FIG. 6A and FIG. 6B. FIG. 6A is a diagram showing one example of electric power supply and demand information of the group of consumers 20 according the present embodiment. FIG. 6B is a diagram showing another example of electric power supply and demand information of the group of consumers 20 according the present embodiment. In FIG. 6A and FIG. 6B, "+ (plus)" indicates that there is a surplus of electric power and "− (minus)" indicates that there is a shortage of electric power.

In the example shown in FIG. 6A, each of consumers A1 to A3 has a deficit in the electric power supply and demand. Consumer A1 is facing a shortage of 40 kW of electric power, consumer A2 is facing a shortage of 5 kW of electric power, and consumer A3 is facing a shortage of 80 kW of electric power.

In the example shown in FIG. 6B, consumer A1 has a surplus in the electric power supply and demand, and consumer A3 has a deficit in the electric power supply and demand. Consumer A1 has a surplus of 20 kW of electric power, consumer A2 has neither a deficit nor a surplus in the electric power supply and demand, and consumer A3 is facing a shortage of 80 kW of electric power.

It is to be noted that the amounts of electric power shown in FIG. 6A and FIG. 6B may each be, for example, an integrated value of the amount of electric power by which the consumer is short of or has a surplus of in a predetermined period. Meanwhile, the amounts of electric power shown in FIG. 6A and FIG. 6B may each be, for example, a predicted value. Furthermore, the values of the supply and demand balance of electric power shown in FIG. 6A and FIG. 6B are each the amount of electric power obtained by subtracting the amount of electric power consumed from the amount of electric power generated by the consumer. As the value of the supply and demand balance of electric power is closer to "0", the electric power supply and demand is said to be more in balance.

Referring back to FIG. 5, based on the electric power supply and demand information, determiner 14 determines whether there is a consumer that has a deficit in the electric power supply and demand (S12). Determiner 14 determines, for example, a consumer that is, according to the electric power supply and demand information shown in FIG. 6A or FIG. 6B, facing an electric power shortage of greater than or equal to a predetermined amount of electric power as the consumer that has a deficit in the electric power supply and demand. When the predetermined amount of electric power is 10 kW, determiner 14 determines in the case shown in FIG. 6A that consumers A1 and A3 each have a deficit in the electric power supply and demand and determines in the case shown in FIG. 6B that consumer A3 has a deficit in the electric power supply and demand. Consumers A1 and A3 shown in FIG. 6A and consumer A3 shown in FIG. 6B are each one example of one target consumer detected to have a deficit in the electric power supply and demand.

Herein, determiner 14 is not limited to making the determination at step S12 with the use of the predetermined amount of electric power, and determiner 14 may instead determine, for example, all the consumers whose electric power supply and demand is indicated by a negative value as the consumers that have a deficit in the electric power supply and demand.

If there is a consumer that has a deficit in the electric power supply and demand (Yes at S12), determiner 14 proceeds to step S13. Meanwhile, if there is no consumer that has a deficit in the electric power supply and demand (No at S12), determiner 14 terminates the process for the electric power interchange.

Next, if there is a consumer that has a deficit in the electric power supply and demand (Yes at S12), determiner 14 determines whether electric power interchange is possible with another consumer within the same group (S13). Determiner 14 determines that the electric power interchange is possible if, for example, the integrated value of the amount of surplus in the electric power supply and demand (the integrated value of the amount of electric power) of consumers, from among the one or more first consumers, that have a surplus in the electric power supply and demand is greater by a predetermined amount or more than the integrated value of the amount of deficit in the electric power supply and demand (the integrated value of the amount of electric power) of the consumer, from among the one or more first consumers, that has a deficit in the electric power supply and demand. Otherwise, determiner 14 determines that the electric power interchange is not possible. The predetermined amount as used herein may be, for example, the amount of electric power estimated to be consumed by electric-powered vehicle 100 when electric-powered vehicle 100 transports electric power. This amount of electric power may be determined, for example, in accordance with the distance between a consumer that has a deficit in the electric power supply and demand and a consumer that has a surplus in the electric power supply and demand.

In the case of FIG. 6A, since all the consumers are facing a shortage of electric power, determiner 14 determines that the electric power interchange is not possible between consumers A1 to A3. Meanwhile, in the case of FIG. 6B, since the amount of deficit (80 kW) in the electric power supply and demand is greater than the amount of surplus (20 kW) in the electric power supply and demand, even if the electric power is interchanged between consumers A1 to A3, the effect of improving the supply and demand balance of electric power is small, and thus determiner 14 determines that the electric power interchange is not possible (e.g., not suitable).

The process at step S13 will now be described with reference to FIG. 7. FIG. 7 is a flowchart showing the details of step S13 of FIG. 5. According to the flowchart shown in FIG. 7, a consumer that is to supply electric power to another consumer that has a deficit in the electric power supply and demand is selected within a group.

As shown in FIG. 7, based on the electric power supply and demand information, determiner 14 determines whether there is a consumer that has a surplus in the electric power supply and demand information (S31). This can be rephrased as that determiner 14, for example, identifies a consumer that has a surplus of electric power by a predetermined amount or more.

Next, if there is a consumer that has a surplus in the electric power supply and demand (Yes at S31), determiner 14 determines whether the distance between the consumer identified at step S31 (the consumer that has a surplus in the electric power supply and demand) and another consumer that has a deficit in the electric power supply and demand is within a predetermined distance (S32). If this distance is within the predetermined distance (Yes at S32), determiner 14 proceeds to step S19. That the determination of Yes is made at step S31 and at step S32 corresponds to that the determination of Yes is made at step S13. Herein, the predetermined distance may be the straight-line distance on a map or may be the distance that electric-powered vehicle 100 travels when transporting electric power.

Meanwhile, if there is no consumer that has a surplus in the electric power supply and demand (No at S31) or if the distance is not within the predetermined distance (No at S32), determiner 14 proceeds to step S14. That the determination of No is made at step S31 or at step S32 corresponds to that the determination of No is made at step S13. If determiner 14 has made the determination of No at step S13, determiner 14 outputs, to cooperator 13, information indicating that electric power interchange is to be carried out with another resource aggregator.

According to the present embodiment, if the distance between the consumers is greater than the predetermined distance, this leads to a greater amount of electric power to be consumed by electric-powered vehicle 100 when electric power is interchanged, and thus the determination of No is made at step S32, and the process proceeds to step S14. This configuration can suppress the amount of electric power that electric-powered vehicle 100 consumes when interchanging electric power and can thus further improve the supply and demand balance of electric power. Herein, the determination at step S32 does not have to be made.

Referring back to FIG. 5, next, cooperator 13 inquires other resource aggregators about the conditions of the electric power supply and demand (S14). Specifically, cooperator 13 transmits, to another resource aggregator, an instruction requesting that the resource aggregator transmit electric power supply and demand information (second information) indicating the conditions of the electric power supply and demand of each of the one or more consumer that the resource aggregator manages. This can be rephrased as that cooperator 13 puts together electric power supply and demand information of other resource aggregators.

At this point, cooperator 13 may transmit the electric power supply and demand information (the first information) obtained at step S11 or the determination result at step S13 to the other resource aggregators.

Herein, cooperator 13 may select a resource aggregator that cooperator 13 is to inquire, based on the reliability shown in FIG. 4. Cooperator 13 may inquire a resource aggregator with a reliability higher than or equal to a predetermined reliability (one example of a threshold value). For example, cooperator 13 may obtain the reliability of each of the other resource aggregators (e.g., three or more resource aggregators including resource aggregators B, C, and D) with regard to the prediction that they make of the electric power supply and demand (e.g., the reliability shown in FIG. 4), and, based on the obtained reliability, cooperator 13 may determine (select), from among the other resource aggregators, one or more resource aggregators with which to engage in the electric power interchange. Determining the one or more resource aggregators is one example of a second determining step. At the second determining step, if the predetermined reliability is 80% or higher, for example, cooperator 13 may determine, of resource aggregators B, C, and D, resource aggregators B and C as the one or more resource aggregators with which to engage in the electric power interchange.

This configuration can suppress a case in which electric power is supplied from a resource aggregator with a low reliability, and thus a necessary amount of electric power can be transported more reliably to the consumer that is having a deficit in the electric power supply and demand.

The other resource aggregators, in response to an inquiry, obtain the electric power supply and demand information from each of the one or more consumers that they manage and transmit the obtained electric power supply and demand information to server device 10A (resource aggregator A).

Next, cooperator 13 obtains, from the other resource aggregators via network 30, the electric power supply and demand information (the second information) and the position information of each of the consumers that the other resource aggregators (e.g., resource aggregators B and C) manage (S15). The electric power supply and demand information includes the supply and demand balance of electric power of each of the consumers that the other resource aggregators manage. Herein, the position information may be included in the electric power supply and demand information. Furthermore, the obtained position information may be stored in storage 17. Step S15 is one example of a second obtaining step.

In the example shown in FIG. 8 described later, the second information includes the supply and demand balance of electric power of each of consumers B1 to B3 that resource aggregator B manages and each of consumers C1 to C3 that resource aggregator C manages. Herein, in a case in which there is only resource aggregator B in the area surrounding resource aggregator A, the second information includes the supply and demand balance of electric power of each of consumers B1 to B3 that resource aggregator B manages.

Herein, for example, step S15 is executed if a deficit or a surplus (see FIG. 12 described later for the surplus) in the electric power supply and demand is detected in the group of consumers 20 based on the first information.

FIG. 8 is a diagram showing one example of the electric power supply and demand information of the groups of consumers of the other resource aggregators according to the present embodiment. FIG. 8 shows the electric power supply and demand information obtained from resource aggregators B and C.

As shown in FIG. 8, the electric power supply and demand information includes the electric power supply and demand and the position information of each of consumers B1 to B3 that resource aggregator B manages and of each of consumers C1 to C3 that resource aggregator C manages. In the example shown in FIG. 8, consumers B1, B3, C2, and C3 each have a surplus in the electric power supply and demand. Meanwhile, consumers B2 and C1 each have the electric power supply and demand of 0 kW. In other words, no consumers among consumers B1 to B3 and consumers C1 to C3 have a deficit in the electric power supply and demand. Therefore, consumers B1 to B3 and consumers C1 to C3 can supply electric power to consumers A1 to A3 within the range of the total value of the amount of surplus of electric power shown in FIG. 8. The position information includes, for example, the latitude and the longitude.

Referring back to FIG. 5, next, based on the electric power supply and demand information shown in FIG. 8 and obtained from the other resource aggregators, cooperator 13 determines from which of the consumers electric power is to be supplied (S16). Step S16 is one example of a first determining step. FIG. 9 is a flowchart showing the details of step S16 of FIG. 5. In the following description, consumers B1 to B3 and consumers C1 to C3 are also referred to as candidate consumers.

As shown in FIG. 9, based on the electric power supply and demand information of the candidate consumers obtained at step S15, cooperator 13 determines whether there is a consumer, among the candidate consumers, that has a surplus in the electric power supply and demand (S41). If, for example, a consumer has a surplus of a predetermined amount or more (e.g., 5 kW or more), cooperator 13 may determine that this consumer has a surplus in the electric power supply and demand. For example, in the case of the electric power supply and demand information shown in FIG. 8, cooperator 13 determines consumers B1, B3, C2, and C3 as the consumers that each have a surplus in the electric power supply and demand.

If there is a consumer that has a surplus in the electric power supply and demand (Yes at S41), cooperator 13 further determines whether the distance between that consumer and the consumer that has a deficit in the electric power supply and demand in the group of consumers 20 is within a predetermined distance (S42). Cooperator 13 makes the determination of step S42 for each of consumers B1, B3, C2, and C3. Herein, the predetermined distance may be the straight-line distance on a map or may be the distance that electric-powered vehicle 100 travels when transporting electric power.

Next, if the distance between the consumer that has a surplus in the electric power supply and demand and the consumer that has a deficit in the electric power supply and demand is within the predetermined distance (Yes at S42), cooperator 13 determines that the consumer that has a deficit in the electric power supply and demand is to receive a supply of electric power from the consumer satisfying the condition (that the distance is within the predetermined distance in this case) (S43). Meanwhile, if the distance between the consumer that has a surplus in the electric power supply and demand and the consumer that has a deficit in the electric power supply and demand is not within the predetermined distance (No at S42), cooperator 13 determines that the consumer that has a deficit in the electric power supply and demand is to receive a supply of electric power from a consumer that is at a short distance from the consumer that has a deficit in the electric power supply and demand (S44). The above can be rephrased as that, at step S42, cooperator 13, for example, determines whether there is a consumer that is within a predetermined distance from the consumer that has a deficit in the electric power supply and demand. The above can additionally be rephrased as that, at step S43, cooperator 13 determines, from among such consumers, out of the candidate consumers, that are within a predetermined distance from one target consumer (e.g., from among second consumers and third consumers located within the predetermined distance from the one target consumer), another target consumer serving as the consumer that is to interchange electric power with the one target consumer. After steps S43 and S44, cooperator 13 proceeds to step S17.

Meanwhile, if there is no consumer that has a surplus in the electric power supply and demand (No at S41), cooperator 13 notifies the manager that manages consumers A1 to A3 (e.g., the manager that manages server device 10A) of the fact that there are no consumers that can supply electric power (S45) and terminates the process.

At this point, based on the first information and the second information, cooperator 13 may further perform matching in the electric power interchange between the consumer that has a deficit in the electric power supply and demand and the consumers that have a surplus in the electric power supply and demand, and, based on the matching, cooperator 13 may determine, from among the candidate consumers, another target consumer to serve as the consumer that is to interchange electric power with (to supply electric power to, in this case) the one target consumer.

Specifically, based on the first information, cooperator 13 may obtain a first amount of electric power of one of a deficit or a surplus (a deficit in this example) in the electric power supply and demand detected at the one target consumer. Furthermore, based on the second information, cooperator 13 may select, from among the candidate consumers, a consumer having a second amount of electric power defined as the total of the amount of electric power of the other of a deficit or a surplus (a surplus in this example) in the electric power supply and demand equal to the first amount of electric power, and may determine the selected consumer as another target consumer.

In the case of the example shown in FIG. 6B (one example of the first information) and FIG. 8 (one example of the second information), cooperator 13 obtains, based on FIG. 6B, 80 kW (one example of the first amount of electric power) that is the amount of electric power that consumer A3 serving as the one target consumer is in deficit of, and selects, based on FIG. 8, a consumer or consumers that have a surplus of 80 kW in total. For example, in the case shown in FIG. 8, the total amount of electric power of consumers B1 and C3 is 80 kW, and thus cooperator 13 determines consumers B1 and C3 as other target consumers. Herein, in consideration of the amount of electric power that electric-powered vehicle 100 consumes when transporting electric power, cooperator 13 may determine, for example, a consumer or consumers with the amount of electric power exceeding 80 kW (e.g., 90 kW, 100 kW, etc.) as other target consumers. In the example described below, consumers B1 and C3 are determined as the other target consumers.

Referring back to FIG. 5, cooperator 13 notifies the other resource aggregators of the consumers determined (S17). Cooperator 13 notifies the other resource aggregators of, for example, the consumers from which electric power is to be supplied and the amount electric power to be supplied. For example, cooperator 13 notifies resource aggregator B that electric power of 30 kW is to be supplied from consumer B1 and notifies resource aggregator C that electric power of 50 kW is to be supplied from consumer C3.

In response to receiving the notification, resource aggregator B may update the electric power supply and demand information of consumer B1. Meanwhile, in response to receiving the notification, resource aggregator C may update the electric power supply and demand information of consumer C3.

Furthermore, cooperator 13 outputs the determined consumers to operation planner 15.

Next, vehicle information obtainer 11 obtains the position information of electric-powered vehicle 100 (S18). Vehicle information obtainer 11 may obtain the position information of, for example, each of a plurality of registered electric-powered vehicles 100. Vehicle information obtainer 11 may perform the process at step S18, for example, periodically or perform the process at step S18 upon triggered by the fact that the determination of Yes is made at step S41. Vehicle information obtainer 11 may store the obtained position information in storage 17.

Next, based on the first information and the second information, operation planner 15 creates an operation plan of electric-powered vehicle 100 such that the deficit and the surplus in the electric power supply and demand are resolved across the plurality of groups by interchanging electric power between the resource aggregators (S19). Step S19 is one example of a creating step.

Operation planner 15 creates an operation plan of electric-powered vehicle 100 such that, if one target consumer is the consumer that has a deficit in the electric power supply and demand, electric-powered vehicle 100 is charged at electric power equipment of, among the candidate consumers, a consumer or consumers (e.g., consumers B1 and C3) having a surplus in the electric power supply and demand as detected based on the second information and such that the charged electric power is supplied to electric power equipment of the one target consumer. Consumers B1 and C3 are the other target consumers determined in the first determining step. The above can be rephrased as that operation planner 15 creates an operation plan of electric-powered vehicle 100 such that electric power is interchanged between one target consumer and another target consumer.

For example, operation planner 15 creates an operation plan for interchanging electric power with a consumer or consumers (e.g., consumers B1 and C3) that each of the one or more aggregators (e.g., resource aggregators B and C) determined in the second determining step manages.

Meanwhile, operation planner 15 may further obtain position information indicating the position of the one target consumer, position information indicating the position of another target consumer, and position information indicating the position of electric-powered vehicle 100 (one example of a third obtaining step) and may create an operation plan based further on these items of position information. An operation plan includes information pertaining to the charging time, the charging location (a consumer where electricity is charged), the amount to be charged, the traveling route, the supplying time, the supplying location (a consumer to which electricity is supplied), and the amount to be supplied. If there are a plurality of electric-powered vehicles 100, for example, operation planner 15 may create an operation plan so as to cause electric-powered vehicle 100 with the shortest travel distance or the shortest travel time to move the electric power. Furthermore, operation planner 15 may create an operation plan such that electric power is suppled to one target consumer with the use of a plurality of electric-powered vehicles 100 or may create an operation plan such that one electric-powered vehicle 100 supplies electric power to a plurality of one target consumers.

Furthermore, if there are a plurality of electric-powered vehicles 100 capable of transporting electric power, operation planner 15 may select electric-powered vehicle 100 based on the battery capacity of the storage battery of each of the plurality of electric-powered vehicle 100 and the amount of electric power to be transported. Operation planner 15 may, for example, select electric-powered vehicle 100 having a battery capacity greater than the amount of electric power to be transported or select electric-powered vehicle 100 whose storage battery has a remaining available capacity (the amount of electric power that can be charged) greater than the amount of electric power to be transported. Furthermore, if there are a plurality of electric-powered vehicles 100 capable of transporting electric power, operation planner 15 may select electric-powered vehicle 100 at the shortest distance to the consumer that has a surplus in the electric power supply and demand and is to charge electric-powered vehicle 100 as electric-powered vehicle 100 to be used for the transportation.

Furthermore, operation planner 15 may calculate the amount of electric power to be consumed in the transportation based on the positions of electric-powered vehicle 100, of the one target consumer, and of the other target consumer and may create an operation plan such that electric-powered vehicle 100 is charged by, in addition to the amount of electric power to be transported from the other target consumer to the one target consumer, the amount of electric power to be consumed.

Furthermore, operation planner 15 may create an operation plan in accordance with a factor that has caused a deficit or a surplus (a deficit in the example shown in FIG. 5) in the electric power supply and demand. Some conceivable factors include a sudden change in the weather conditions, a power failure, and an occurrence of a natural disaster (an earthquake, a torrential rainfall, etc.). Such factors may arise in a localized geographical location or range. Furthermore, a sudden change in the weather conditions may end in a short period of time (e.g., in around 30 minutes or 1 hour).

For example, when the factor is an occurrence of a power failure or a natural disaster, operation planner 15 may create an operation plan that includes a traveling route avoiding the location at which or the range in which the power failure or the natural disaster has occurred, in order to ensure the safety of the travel. Furthermore, for example, when the factor is a sudden change in the weather conditions, operation planner 15 may create an operation plan that includes the time at which electric-powered vehicle 100 is to be made to transport electric power as determined in accordance with the content of the sudden change in the weather conditions.

Herein, operation planner 15 may identify a factor based, for example, on information indicating the latest conditions obtained from a server device that manages the weather conditions, the conditions of power failures, the conditions of natural disasters, or the like.

Figure 10:
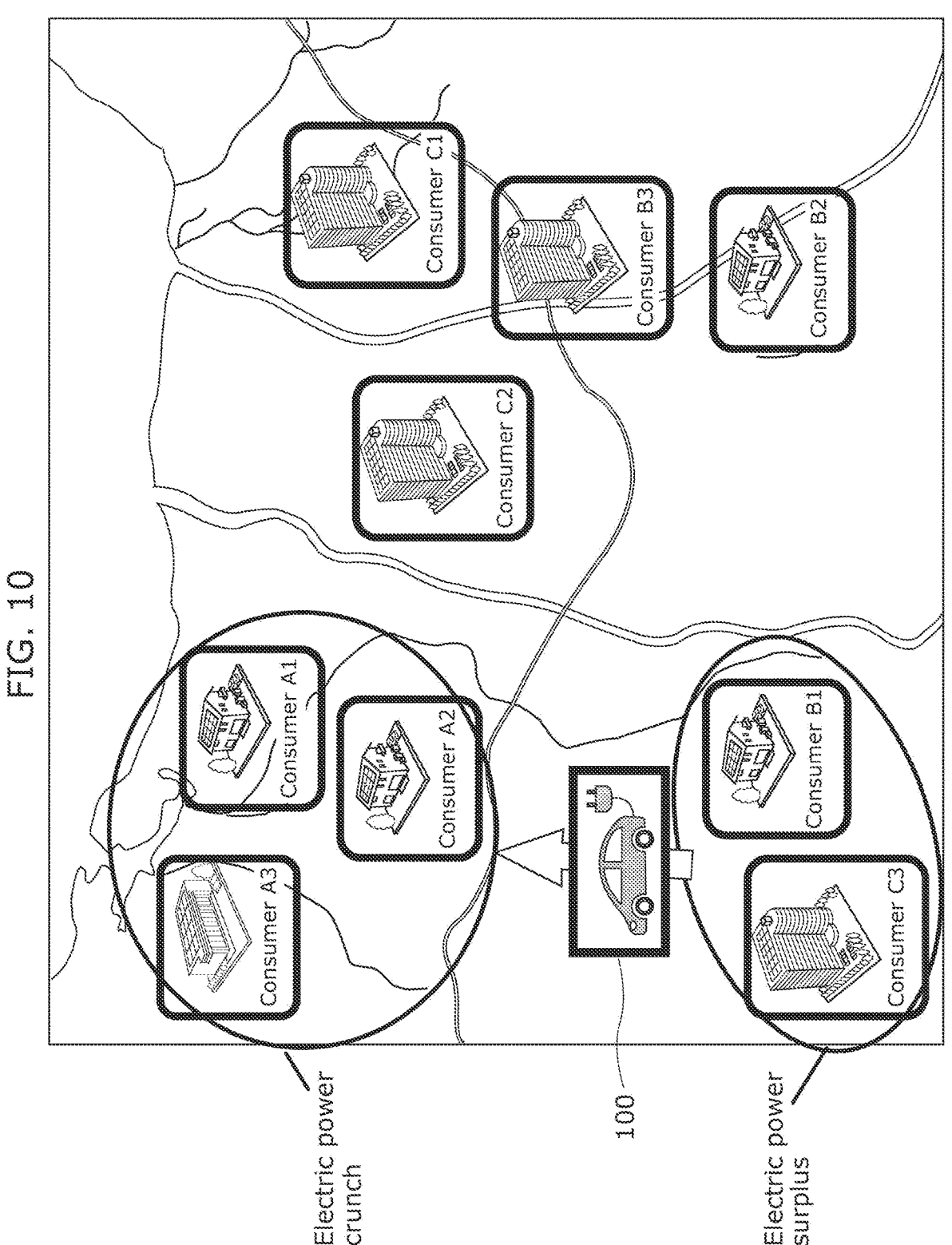
FIG. 10 is a schematic diagram showing one example of electric power interchange in an electric power interchange system according to an embodiment.

FIG. 10 is a schematic diagram showing one example of electric power interchange in electric power interchange system 1 according to the present embodiment. In the example shown in FIG. 10, each of consumers A1 to A3 that resource aggregator A manages is experiencing an electric power crunch (e.g., see FIG. 6A), and, with the use of electric-powered vehicle 100, electric power is to be supplied to consumers A1 to A3 from consumer B1 that resource aggregator B manages and from consumer C3 that resource aggregator C manages. In this case, operation planner 15 creates an operation plan of electric-powered vehicle 100 such that electric-powered vehicle 100 is charged at electric power equipment of consumer B1 and electric power equipment of C3 and the charged electric power is supplied to the electric power equipment of each of consumers A1 to A3.

Figure 11:
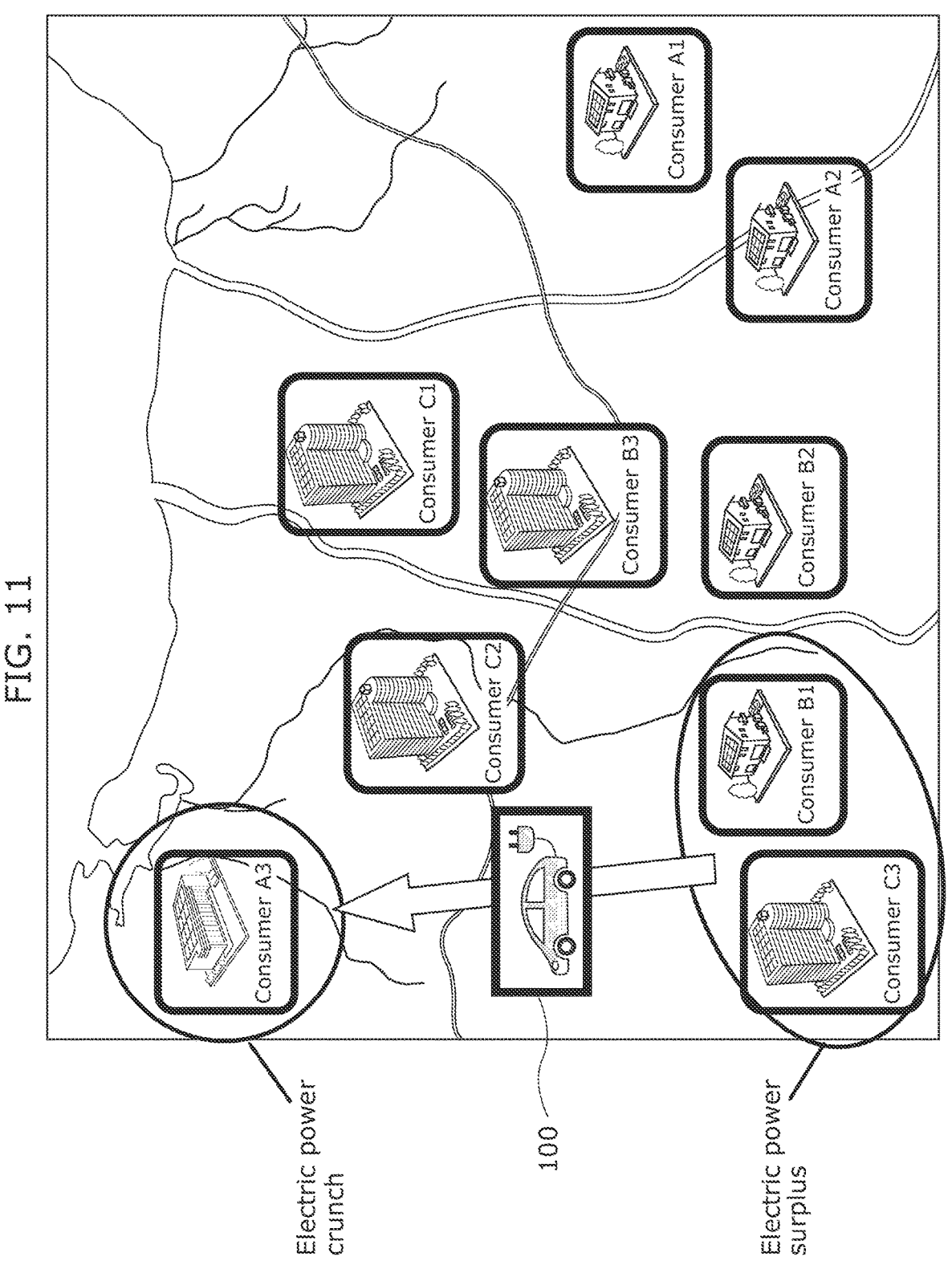
FIG. 11 is a schematic diagram showing another example of electric power interchange in an electric power interchange system according to an embodiment.

FIG. 11 is a schematic diagram showing another example of electric power interchange in electric power interchange system 1 according to the present embodiment. In the example shown in FIG. 11, consumer A3 among consumers A1 to A3 that resource aggregator A manages is experiencing an electric power crunch (e.g., see FIG. 6B), and, with the use of electric-powered vehicle 100, electric power is to be supplied to consumer A3 from consumer B1 that resource aggregator B manages and to consumer C3 that resource aggregator C manages. In this case, operation planner 15 creates an operation plan of electric-powered vehicle 100 such that electric-powered vehicle 100 is charged at electric power equipment of consumer B1 and electric power equipment of consumer C3 and the charged electric power is supplied to electric power equipment of consumer A3.

Referring back to FIG. 5, next, transmitter 16 transmits the operation plan that operation planner 15 has created to electric-powered vehicle 100 (S20). Step S20 is one example of a transmitting step.

With the operation above, in electric power interchange system 1, electric-powered vehicle 100 that has obtained an operation plan can have predetermined electric power charged at another target consumer that another resource aggregator manages, and electric-powered vehicle 100 can supply the predetermined electric power to one target consumer that resource aggregator A manages. Thus, electric power can be interchanged between the resource aggregators. In the example shown in FIG. 5, the deficit in the electric power supply and demand that the consumers managed by resource aggregator A have and the surplus in the electric power supply and demand that the consumers managed by resource aggregators B and C have can be resolved simultaneously. Therefore, electric power interchange system 1 according to the present embodiment can optimize the supply and demand balance of electric power in the entire system that includes a plurality of resource aggregators.

Figure 12:
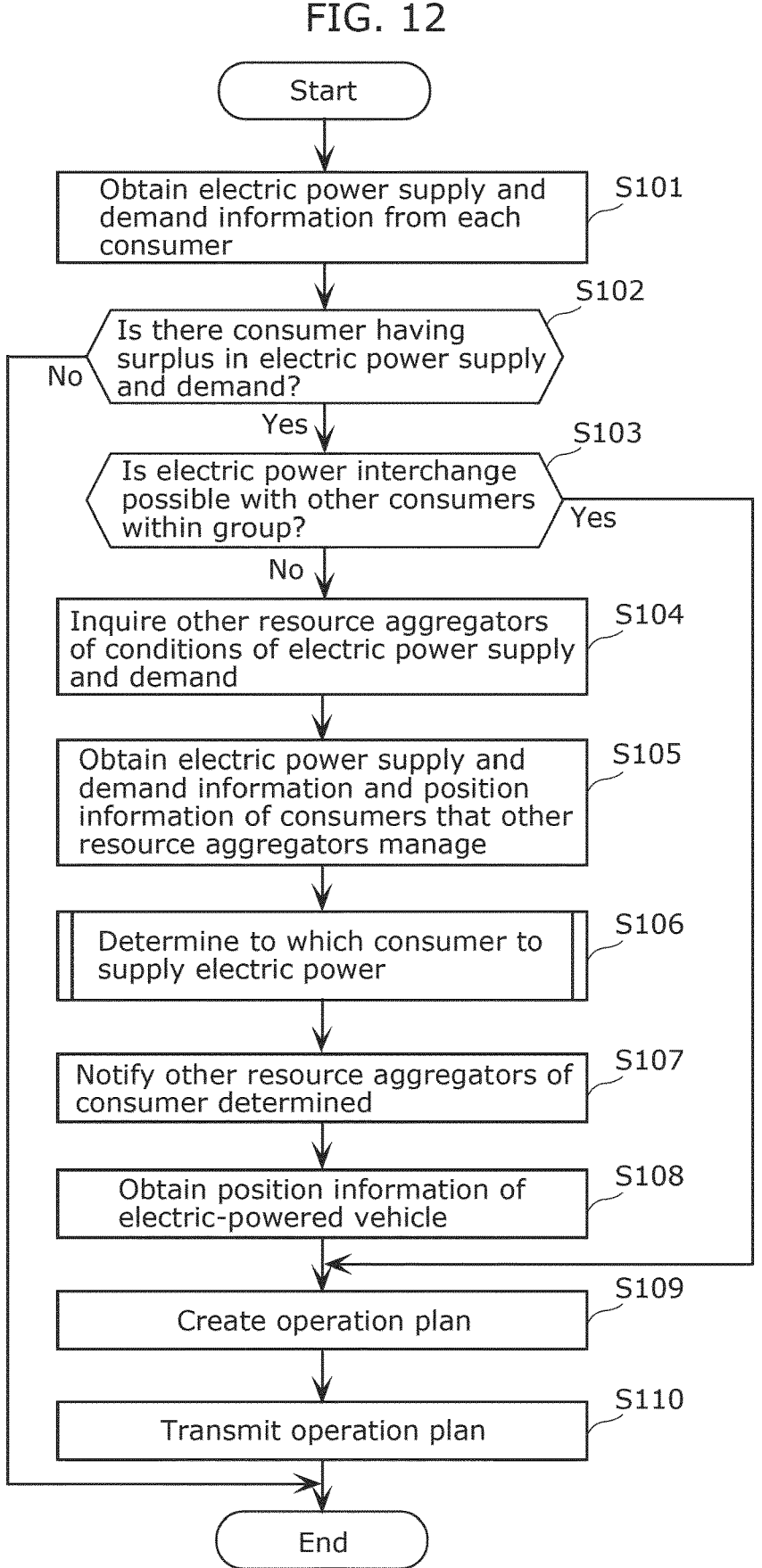
FIG. 12 is a flowchart showing another example of an operation of an electric power interchange system according to an embodiment.

Next, another example of an operation of electric power interchange system 1 according to the present embodiment will be described with reference to FIG. 12. FIG. 12 is a flowchart showing another example of an operation (an electric power interchange method) of electric power interchange system 1 according to the present embodiment. In the example described with reference to FIG. 12, a consumer of resource aggregator A has a surplus in the electric power supply and demand, and this consumer supplies electric power to a consumer or consumers of each of resource aggregators B and C. Herein, a consumer that has a surplus may supply electric power to a consumer of one of resource aggregator B or resource aggregator C. Herein, steps S101, S104, S105, S108, and S110 shown in FIG. 12 are similar to steps S11, S14, S15, S18, and S20, respectively, shown in FIG. 5, and thus description thereof will be omitted. Supplying electric power is one example of interchanging electric power.

As shown in FIG. 12, based on the electric power supply and demand information (the first information) obtained at step S101, determiner 14 determines whether there is a consumer that has a surplus in the electric power supply and demand (S102). Determiner 14 determines, for example, a consumer that, according to the electric power supply and demand information, has an electric power surplus of a predetermined amount of electric power or more as the consumer that has a surplus in the electric power supply and demand. The consumer detected to have a surplus in the electric power supply and demand is one example of one target consumer.

Herein, determiner 14 is not limited to making the determination at step S102 with the use of the predetermined amount of electric power, and determiner 14 may determine, for example, all the consumers whose supply and demand balance of electric power is in the positive as consumers that have a surplus in the electric power supply and demand.

Next, if there is a consumer that has a surplus in the electric power supply and demand (Yes at S102), determiner 14 determines whether electric power can be interchanged between this consumer and other consumers within the group (S103). Determiner 14 determines that the electric power interchange is possible if, for example, the integrated value of the amount of surplus in the electric power supply and demand (the integrated value of the amount of electric power) of consumers, from among the one or more first consumers, that have a surplus in the electric power supply and demand is smaller than or equal to the integrated value of the amount of deficit in the electric power supply and demand (the integrated value of the amount of electric power) of the consumer or consumers, from among the one or more first consumers, that have a deficit in the electric power supply and demand or smaller than or equal to an integrated value obtained by adding a predetermined amount to the aforementioned integrated value (Yes at S103). Otherwise, determiner 14 determines that the electric power interchange is not possible (No at S103). The predetermined amount as used in this example may be, for example, the amount of electric power estimated to be consumed by electric-powered vehicle 100 when electric power is transported by electric-powered vehicle 100. This amount of electric power may be determined, for example, in accordance with the distance between a consumer that has a deficit in the electric power supply and demand and a consumer that has a surplus in the electric power supply and demand.

Next, based on the electric power supply and demand information (the second information) obtained from the other resource aggregators, cooperator 13 determines to which consumer electric power is to be supplied (S106). Step S106 is one example of a first determining step. Cooperator 13 may determine, for example, a consumer that has a deficit in the electric power supply and demand and is within a predetermined distance from the one target consumer as the consumer to which electric power is to be supplied.

Next, cooperator 13 notifies the other resource aggregators of the consumer determined (S107). Cooperator 13 notifies the other resource aggregators of, for example, the consumer to which electric power is to be supplied and the amount of electric power to be supplied. For example, when 30 kW of electric power is to be supplied from the one target consumer (e.g., consumer A1) to consumer B1, cooperator 13 notifies resource aggregator B that 30 kW of electric power is to be supplied to consumer B1. Meanwhile, when 50 kW of electric power is to be supplied from the one target consumer (e.g., consumer A1) to consumer C3, cooperator 13 notifies resource aggregator C that 50 kW of electric power is to be supplied to consumer C3.

Furthermore, cooperator 13 outputs the determined consumers to operation planner 15.

Next, based on the first information and the second information, operation planner 15 creates an operation plan of electric-powered vehicle 100 such that the deficit and the surplus in the electric power supply and demand are resolved across the plurality of groups by interchanging electric power between the resource aggregators (S109). Step S109 is one example of a creating step.

When the one target consumer is the consumer that has a surplus in the electric power supply and demand, operation planner 15 creates an operation plan of electric-powered vehicle 100 such that electric-powered vehicle 100 is charged at electric power equipment of the one target consumer and the charged electric power is supplied to electric power equipment of, among the candidate consumers, the consumer that has a deficit in the electric power supply and demand as detected based on the second information. This can be rephrased as that operation planner 15 creates an operation plan of electric-powered vehicle 100 such that electric power is interchanged between the other target consumer and the one target consumer.

For example, operation planner 15 creates an operation plan for interchanging electric power with a consumer or consumers (e.g., consumers B1 and C3) that the one or more aggregators (e.g., resource aggregators B and C) determined in the second determining step manage. Meanwhile, operation planner 15 may further obtain position information indicating the position of the one target consumer, position information indicating the position of the other target consumers, and position information indicating the position of electric-powered vehicle 100 (one example of a third obtaining step) and may create an operation plan based further on these items of position information.

With the operation above, the surplus of the electric power in the group of consumers 20 can be supplied to a consumer in another group that has a deficit in the electric power supply and demand, and thus the supply and demand balance of electric power across different groups can be improved.

Other Embodiments

Thus far, the electric power interchange method and so forth according to the present disclosure have been described based on the foregoing embodiment, but the present disclosure is not limited by the foregoing embodiment.

For example, in the example described according to the foregoing embodiment, electric power is transported with the use of electric-powered vehicle 100. Alternatively, electric power may be transported with the use of any mobile bodies other than electric-powered vehicle 100 as long as such mobile bodies are provided with a storage battery. For example, such a mobile body may be a robot provided with a storage battery (e.g., a robot capable of moving autonomously), a light vehicle provided with a storage battery (e.g., a bicycle), a motorized bicycle provided with a storage battery, or a flying body provided with a storage battery (e.g., a drone). A flight plan including, for example, a flying route or a flying time to be observed when a flying body transports electric power is one example of a moving plan.

Furthermore, each of one target consumer and another target consumer according to the foregoing embodiment may be a single consumer or include a plurality of consumers.

Furthermore, in the example described according to the foregoing embodiment, another target consumer is determined based on the distance between one target consumer and a candidate consumer. Alternatively, another target consumer may be determined based, for example, on the travel time. For example, operation planner 15 may determine, as electric-powered vehicle 100 to be used for the transportation, electric-powered vehicle 100 that can arrive at the other target consumer at the time that is predicted for the electric power supply and demand to fall into a deficit, based on the current time and the travel time of electric-powered vehicle 100.

Furthermore, in the example described according to the foregoing embodiment, the electric power interchange method is carried out in a server device of a resource aggregator. This, however, is not a limiting example, and the electric power interchange method may be carried out by, for example, a server device of an aggregation coordinator. Furthermore, the electric power interchange method according to the foregoing embodiment may be carried out between a resource aggregator and an aggregation coordinator. For example, electric power may be adjusted (electric power may be interchanged) between a resource aggregator that manages one community and an aggregation coordinator that manages another community.

Furthermore, in the example described according to the foregoing embodiment, when creating an operation plan, a server device obtains position information of consumers that other resource aggregators manage. This, however, is not a limiting example, and the position information may be stored in advance in the server device. In other words, when an operation plan is created, the position information of the consumers that the other resource aggregators manage does not have to be obtained.

Furthermore, in the example described according to the foregoing embodiment, a server device includes a single device. Alternatively, a server device may include a plurality of devices. In a case in which a server device includes a plurality of devices, the functions of the server device may be distributed over the plurality of devices in any manner. Furthermore, at least part of the functions of the server device according to the foregoing embodiment may be provided in a consumer. For example, the predicted values of the amount of electric power generated and of the amount of electric power consumed may be calculated by a processing device (e.g., a processing device provided in an apparatus) of a consumer.

The orders of the plurality of processes described according to the foregoing embodiments are merely examples. The orders of the plurality of processes may be modified, or at least part of the plurality of processes may be executed in parallel.

The division of the functional blocks in the block diagram is merely an example. A plurality of functional blocks may be implemented as a single functional block, a single functional block may be divided into a plurality of functional blocks, or some of the functions may be transferred to another functional block. The functions of a plurality of functional blocks having similar functions may be processed in parallel or through time division by a single piece of hardware or software.

In the foregoing embodiments, the constituent elements may each be implemented by a dedicated piece of hardware or may each be implemented through the execution of a software program suitable for the corresponding constituent element. Each of the constituent elements may be implemented as a program executing unit, such as a processor, reads out a software program recorded on a recording medium, such as a hard disk or a semiconductor memory, and executes the software program. The processor is constituted by one or more electronic circuits including a semiconductor integrated circuit (IC) or a large scale integration (LSI) circuit. A plurality of electronic circuits may be integrated into a single chip or provided in respective chips. A plurality of chips may be integrated into a single device or provided in respective devices.

A system LSI circuit is an ultra-multifunctional LSI circuit manufactured by integrating a plurality of processors on a single chip and is, specifically, a computer system that includes, for example, a microprocessor, a read only memory (ROM), or a random access memory (RAM). The ROM stores a computer program. The microprocessor operates in accordance with the computer program, and thus the system LSI circuit implements its functions.

Although a system LSI circuit is illustrated above, depending on the difference in the degree of integration, such a circuit may also be called an IC, an LSI circuit, a super LSI circuit, or an ultra LSI circuit. The technique for circuit integration is not limited to LSI, and an integrated circuit may be implemented by a dedicated circuit or a general purpose processor. A field programmable gate array (FPGA) that can be programmed after an LSI circuit is manufactured or a reconfigurable processor in which the connection or the setting of the circuit cells within an LSI circuit can be reconfigured may also be used.

According to the foregoing embodiments, general or specific aspects of the above may be implemented in the form of a system, a method, an integrated circuit, a computer program, or a non-transitory computer-readable recording medium, such as a CD-ROM, or through any desired combination of a system, a method, an integrated circuit, a computer program, and a recording medium. The program may be a computer program that causes a computer to execute each characteristic step included in the electric power interchange method.

One aspect of the present disclosure may be a non-transitory computer-readable recording medium having such a program recorded thereon. For example, such a program may be recorded on a recording medium, which then may be distributed. For example, a distributed program can be installed onto a device including another processor, and the program can be executed by this processor. Thus, the device can perform each process described above. The program may be stored in advance in a recording medium or supplied to a recording medium via a wide area communication network including the internet.

Aside from the above, an embodiment obtained by making various modifications that a person skilled in the art can conceive of to the foregoing embodiments or an embodiment achieved by combining, as desired, the constituent elements and the functions according to the embodiments within the scope that does not depart from the spirit of the present disclosure is also encompassed by the present disclosure.

INDUSTRIAL APPLICABILITY

The present disclosure finds its effective use in an electric power interchange system and so forth that use the mechanism of VPP.

The invention claimed is:

1. An electric power interchange method of interchanging electric power with use of a mobile body provided with a storage battery, the electric power interchange method using a first aggregator that manages electric power supply and demand of one or more first consumers and a second aggregator that manages electric power supply and demand of one or more second consumers different from the one or more first consumers, the electric power interchange method comprising:

first obtaining of obtaining first information that includes electric power supply and demand conditions of each of the one or more first consumers managed by the first aggregator;

second obtaining of obtaining second information that includes electric power supply and demand conditions of each of the one or more second consumers managed by the second aggregator;

when a deficit or a surplus in the electric power supply and demand is detected in the one or more first consumers based on the first information, creating a moving plan of the mobile body based on the first information and the second information, the moving plan enabling electric power to be interchanged between the one or more second consumers and, among the one or more first consumers, one target consumer detected to have the deficit or the surplus; and transmitting the moving plan created.

2. The electric power interchange method according to claim 1, wherein in the creating of the moving plan, when the one target consumer has a surplus in the electric power supply and demand, the moving plan is created to enable the mobile body to be charged at electric power equipment of the one target consumer and charged electric power to be supplied to electric power equipment of, among the one or more second consumers, a consumer having a deficit in the electric power supply and demand as obtained based on the second information, or when the one target consumer has a deficit in the electric power supply and demand, the moving plan is created to enable the mobile body to be charged at electric power equipment of, among the one or more second consumers, a consumer having a surplus in the electric power supply and demand as obtained based on the second information and charged electric power to be supplied to electric power equipment of the one target consumer.

3. The electric power interchange method according to claim 2, further comprising:

first determining of performing matching in electric power interchange between the one target consumer and the one or more second consumers based on the first information and the second information and, based on the matching, determining, among the one or more second consumers, an other target consumer that is to interchange electric power with the one target consumer, wherein in the creating of the moving plan, the moving plan is created to enable electric power to be interchanged between the one target consumer and the other target consumer determined in the first determining.

4. The electric power interchange method according to claim 3, wherein in the first determining, a first amount of electric power in one of the deficit or the surplus detected of the one target consumer is obtained based on the first information, and a consumer whose second amount of electric power defined as a total amount of electric power in an other of the deficit or the surplus equals the first amount of electric power is selected from the one or more second consumers based on the second information, and the consumer selected is determined as the other target consumer.

5. The electric power interchange method according to claim 3, further comprising:

third obtaining of obtaining position information indicating a position of the one target consumer, a position of the other target consumer, and a position of the mobile body, wherein in the creating of the moving plan, the moving plan is created based further on the position information.

6. The electric power interchange method according to claim 3, wherein in the first determining, the other target consumer is determined from at least one second consumer that is within a predetermined distance to the one target consumer, out of the one or more second consumers, the at least one second consumer being included in the one or more second consumers.

7. The electric power interchange method according to claim 1, wherein a third aggregator manages electric power supply and demand of one or more third consumers, the second information further includes electric power supply and demand conditions of each of the one or more third consumers managed by the third aggregator, and in the creating of the moving plan, the moving plan is created to enable electric power to be interchanged between (i) the one target consumer and (ii) the one or more second consumers and the one or more third consumers.

8. The electric power interchange method according to claim 7, further comprising:

second determining of obtaining a reliability of each of three or more aggregators, including the second aggregator and the third aggregator, in a prediction of the electric power supply and demand conditions and, based on the reliability, determining, from the three or more aggregators, one or more aggregators with which to interchange electric power, wherein in the creating of the moving plan, the moving plan is created to enable for electric power interchange with consumers managed by the one or more aggregators determined in the second determining.

9. The electric power interchange method according to claim 1, wherein the mobile body is a vehicle equipped with a self-driving function.

10. The electric power interchange method according to claim 1, wherein the second obtaining is executed when the deficit or the surplus in the electric power supply and demand is detected in the one or more first consumers based on the first information.

11. An electric power interchange system that interchanges electric power with use of a mobile body provided with a storage battery, the electric power interchange system using a first aggregator that manages electric power supply and demand of one or more first consumers and a second aggregator that manages electric power supply and demand of one or more second consumers different from the one or more first consumers, the electric power interchange system comprising:

a first obtainer that obtains first information that includes electric power supply and demand conditions of each of the one or more first consumers managed by the first aggregator;

a second obtainer that obtains second information that includes electric power supply and demand conditions of each of the one or more second consumers managed by the second aggregator;

a creator that, when a deficit or a surplus in the electric power supply and demand is detected in the one or more first consumers based on the first information, creates a moving plan of the mobile body based on the first information and the second information, the moving plan enabling electric power to be interchanged between the one or more second consumers and, among the one or more first consumers, one target consumer detected to have the deficit or the surplus; and a transmitter that transmits the moving plan created.

12. A non-transitory computer-readable recording medium having a program recorded thereon for causing a computer to execute the electric power interchange method according to claim 1.

* * * * *